US012812480B2

(12) United States Patent
Bai et al.

(10) Patent No.: US 12,812,480 B2
(45) Date of Patent: Nov. 24, 2026

(54) TECHNIQUES FOR LAYER 1/LAYER 2 TRIGGERED MOBILITY DIFFERENTIAL REPORTING

(71) Applicant: QUALCOMM Incorporated, San Diego, CA (US)

(72) Inventors: Tianyang Bai, Mountain View, CA (US); Yan Zhou, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 281 days.

(21) Appl. No.: 18/638,871

(22) Filed: Apr. 18, 2024

(65) Prior Publication Data

US 2024/0381190 A1 Nov. 14, 2024

Related U.S. Application Data

(60) Provisional application No. 63/501,883, filed on May 12, 2023.

(51) Int. Cl.
*H04W 36/00* (2009.01)
*H04W 36/30* (2009.01)

(52) U.S. Cl.
CPC ... *H04W 36/0058* (2018.08); *H04W 36/0061* (2013.01); *H04W 36/008355* (2023.05); *H04W 36/304* (2023.05)

(58) Field of Classification Search
None
See application file for complete search history.

(56) References Cited

U.S. PATENT DOCUMENTS

| | | | | |
|---|---|---|---|---|
| 2021/0195453 | A1 | 6/2021 | Zhang et al. | |
| 2022/0322115 | A1 | 10/2022 | Zhou et al. | |
| 2023/0370884 | A1* | 11/2023 | Damnjanovic | H04B 17/328 |
| 2023/0413130 | A1* | 12/2023 | Zhou | H04W 36/0058 |
| 2024/0340746 | A1* | 10/2024 | Bai | H04L 5/0048 |
| 2025/0380174 | A1* | 12/2025 | Zhou | H04W 24/10 |

FOREIGN PATENT DOCUMENTS

| | | | |
|---|---|---|---|
| WO | 2023219800 | A1 | 11/2023 |
| WO | 2024007248 | A1 | 1/2024 |

OTHER PUBLICATIONS

Gao B (ZTE)., et al., "Enhancements on TA Management to Reduce Latency", 3GPP TSG RAN WG1 Meeting #114, R1-2306617, Toulouse, France, Aug. 21-25, 2023, 6 Pages, XP052435848.
International Search Report and Written Opinion—PCT/US2024/025488—ISA/EPO—Sep. 25, 2024.
Partial International Search Report—PCT/US2024/025488—ISA/EPO—Aug. 2, 2024.

* cited by examiner

*Primary Examiner* — Anh Vu H Ly
(74) *Attorney, Agent, or Firm* — Harrity & Harrity, LLP

(57) ABSTRACT

Various aspects of the present disclosure generally relate to wireless communication. In some aspects, a user equipment (UE) may receive configuration information that configures measurement of multiple candidate cells associated with a layer 1/layer 2 triggered mobility procedure. The UE may perform measurements associated with the multiple candidate cells based at least in part on the configuration information. The UE may transmit a layer 1 measurement report that reports the measurements associated with the multiple candidate cells based at least in part on differential reporting. Numerous other aspects are described.

20 Claims, 14 Drawing Sheets

TECHNIQUES FOR LAYER 1/LAYER 2 TRIGGERED MOBILITY DIFFERENTIAL REPORTING

CROSS-REFERENCE TO RELATED APPLICATION

This patent application claims priority to U.S. Provisional Patent Application No. 63/501,883, filed on May 12, 2023, entitled "TECHNIQUES FOR LAYER 1/LAYER 2 TRIGGERED MOBILITY DIFFERENTIAL REPORTING," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for layer 1/layer 2 triggered mobility differential reporting.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

Some aspects described herein relate to a method of wireless communication performed by a user equipment (UE). The method may include receiving configuration information that configures measurement of multiple candidate cells associated with a layer 1/layer 2 triggered mobility (LTM) procedure. The method may include performing measurements associated with the multiple candidate cells based at least in part on the configuration information. The method may include transmitting a layer 1 (L1) measurement report that reports the measurements associated with the multiple candidate cells based at least in part on differential reporting.

Some aspects described herein relate to a method of wireless communication performed by a UE. The method may include receiving configuration information that configures measurement of multiple candidate cells associated with an LTM procedure. The method may include receiving a physical downlink control channel (PDCCH) order triggering a random access channel (RACH) procedure associated with a candidate cell, of the multiple candidate cells, that is indicated by the PDCCH order. The method may include performing the RACH procedure associated with the candidate cell that is indicated by the PDCCH order by identifying at least one transmission parameter associated with the RACH procedure based at least in part on the configuration information.

Some aspects described herein relate to a method of wireless communication performed by a network node. The method may include transmitting, to a UE, configuration information that configures measurement of multiple candidate cells associated with an LTM procedure. The method may include receiving, from the UE, an L1 measurement report that reports the measurements associated with the multiple candidate cells based at least in part on differential reporting.

Some aspects described herein relate to a method of wireless communication performed by a network node. The method may include transmitting, to a UE, configuration information that configures measurement of multiple candidate cells associated with an LTM procedure. The method may include transmitting, to the UE, a PDCCH order triggering a RACH procedure associated with a candidate cell, of the multiple candidate cells, that is indicated by the PDCCH order, where a RACH procedure associated with the candidate cell that is indicated by the PDCCH order is based at least in part on at least one transmission parameter that is identified based at least in part on the configuration information.

Some aspects described herein relate to a UE for wireless communication. The UE may include one or more memories and one or more processors coupled to the one or more memories. The one or more processors may be configured to receive configuration information that configures measurement of multiple candidate cells associated with an LTM procedure. The one or more processors may be configured to perform measurements associated with the multiple candidate cells based at least in part on the configuration information. The one or more processors may be configured to transmit an L1 measurement report that reports the measurements associated with the multiple candidate cells based at least in part on differential reporting.

Some aspects described herein relate to a UE for wireless communication. The UE may include one or more memories and one or more processors coupled to the one or more memories. The one or more processors may be configured to receive configuration information that configures measurement of multiple candidate cells associated with an LTM procedure. The one or more processors may be configured to receive a PDCCH order triggering a RACH procedure associated with a candidate cell, of the multiple candidate cells, that is indicated by the PDCCH order. The one or more processors may be configured to perform the RACH procedure associated with the candidate cell that is indicated by the PDCCH order by identifying at least one transmission parameter associated with the RACH procedure based at least in part on the configuration information.

Some aspects described herein relate to a network node for wireless communication. The network node may include one or more memories and one or more processors coupled to the one or more memories. The one or more processors may be configured to transmit, to a UE, configuration information that configures measurement of multiple candidate cells associated with an LTM procedure. The one or more processors may be configured to receive, from the UE, an L1 measurement report that reports the measurements associated with the multiple candidate cells based at least in part on differential reporting.

Some aspects described herein relate to a network node for wireless communication. The network node may include one or more memories and one or more processors coupled to the one or more memories. The one or more processors may be configured to transmit, to a UE, configuration information that configures measurement of multiple candidate cells associated with an LTM procedure. The one or more processors may be configured to transmit, to the UE, a PDCCH order triggering a RACH procedure associated with a candidate cell, of the multiple candidate cells, that is indicated by the PDCCH order, where a RACH procedure associated with the candidate cell that is indicated by the PDCCH order is based at least in part on at least one transmission parameter that is identified based at least in part on the configuration information.

Some aspects described herein relate to a non-transitory computer-readable medium that stores a set of instructions for wireless communication by a UE. The set of instructions, when executed by one or more processors of the UE, may cause the UE to receive configuration information that configures measurement of multiple candidate cells associated with an LTM procedure. The set of instructions, when executed by one or more processors of the UE, may cause the UE to perform measurements associated with the multiple candidate cells based at least in part on the configuration information. The set of instructions, when executed by one or more processors of the UE, may cause the UE to transmit an L1 measurement report that reports the measurements associated with the multiple candidate cells based at least in part on differential reporting.

Some aspects described herein relate to a non-transitory computer-readable medium that stores a set of instructions for wireless communication by a UE. The set of instructions, when executed by one or more processors of the UE, may cause the UE to receive configuration information that configures measurement of multiple candidate cells associated with an LTM procedure. The set of instructions, when executed by one or more processors of the UE, may cause the UE to receive a PDCCH order triggering a RACH procedure associated with a candidate cell, of the multiple candidate cells, that is indicated by the PDCCH order. The set of instructions, when executed by one or more processors of the UE, may cause the UE to perform the RACH procedure associated with the candidate cell that is indicated by the PDCCH order by identifying at least one transmission parameter associated with the RACH procedure based at least in part on the configuration information.

Some aspects described herein relate to a non-transitory computer-readable medium that stores a set of instructions for wireless communication by a network node. The set of instructions, when executed by one or more processors of the network node, may cause the network node to transmit, to a UE, configuration information that configures measurement of multiple candidate cells associated with an LTM procedure. The set of instructions, when executed by one or more processors of the network node, may cause the network node to receive, from the UE, an L1 measurement report that reports the measurements associated with the multiple candidate cells based at least in part on differential reporting.

Some aspects described herein relate to a non-transitory computer-readable medium that stores a set of instructions for wireless communication by a network node. The set of instructions, when executed by one or more processors of the network node, may cause the network node to transmit, to a UE, configuration information that configures measurement of multiple candidate cells associated with an LTM procedure. The set of instructions, when executed by one or more processors of the network node, may cause the network node to transmit, to the UE, a PDCCH order triggering a RACH procedure associated with a candidate cell, of the multiple candidate cells, that is indicated by the PDCCH order, where a RACH procedure associated with the candidate cell that is indicated by the PDCCH order is based at least in part on at least one transmission parameter that is identified based at least in part on the configuration information.

Some aspects described herein relate to an apparatus for wireless communication. The apparatus may include means for receiving configuration information that configures measurement of multiple candidate cells associated with an LTM procedure. The apparatus may include means for performing measurements associated with the multiple candidate cells based at least in part on the configuration information. The apparatus may include means for transmitting an L1 measurement report that reports the measurements associated with the multiple candidate cells based at least in part on differential reporting.

Some aspects described herein relate to an apparatus for wireless communication. The apparatus may include means for receiving configuration information that configures measurement of multiple candidate cells associated with an LTM procedure. The apparatus may include means for receiving a PDCCH order triggering a RACH procedure associated with a candidate cell, of the multiple candidate cells, that is indicated by the PDCCH order. The apparatus may include means for performing the RACH procedure associated with the candidate cell that is indicated by the PDCCH order by identifying at least one transmission parameter associated with the RACH procedure based at least in part on the configuration information.

Some aspects described herein relate to an apparatus for wireless communication. The apparatus may include means for transmitting, to a UE, configuration information that configures measurement of multiple candidate cells associated with an LTM procedure. The apparatus may include means for receiving, from the UE, an L1 measurement report that reports the measurements associated with the multiple candidate cells based at least in part on differential reporting.

Some aspects described herein relate to an apparatus for wireless communication. The apparatus may include means for transmitting, to a UE, configuration information that configures measurement of multiple candidate cells associated with an LTM procedure. The apparatus may include means for transmitting, to the UE, a PDCCH order triggering a RACH procedure associated with a candidate cell, of the multiple candidate cells, that is indicated by the PDCCH order, where a RACH procedure associated with the candidate cell that is indicated by the PDCCH order is based at least in part on at least one transmission parameter that is identified based at least in part on the configuration information.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
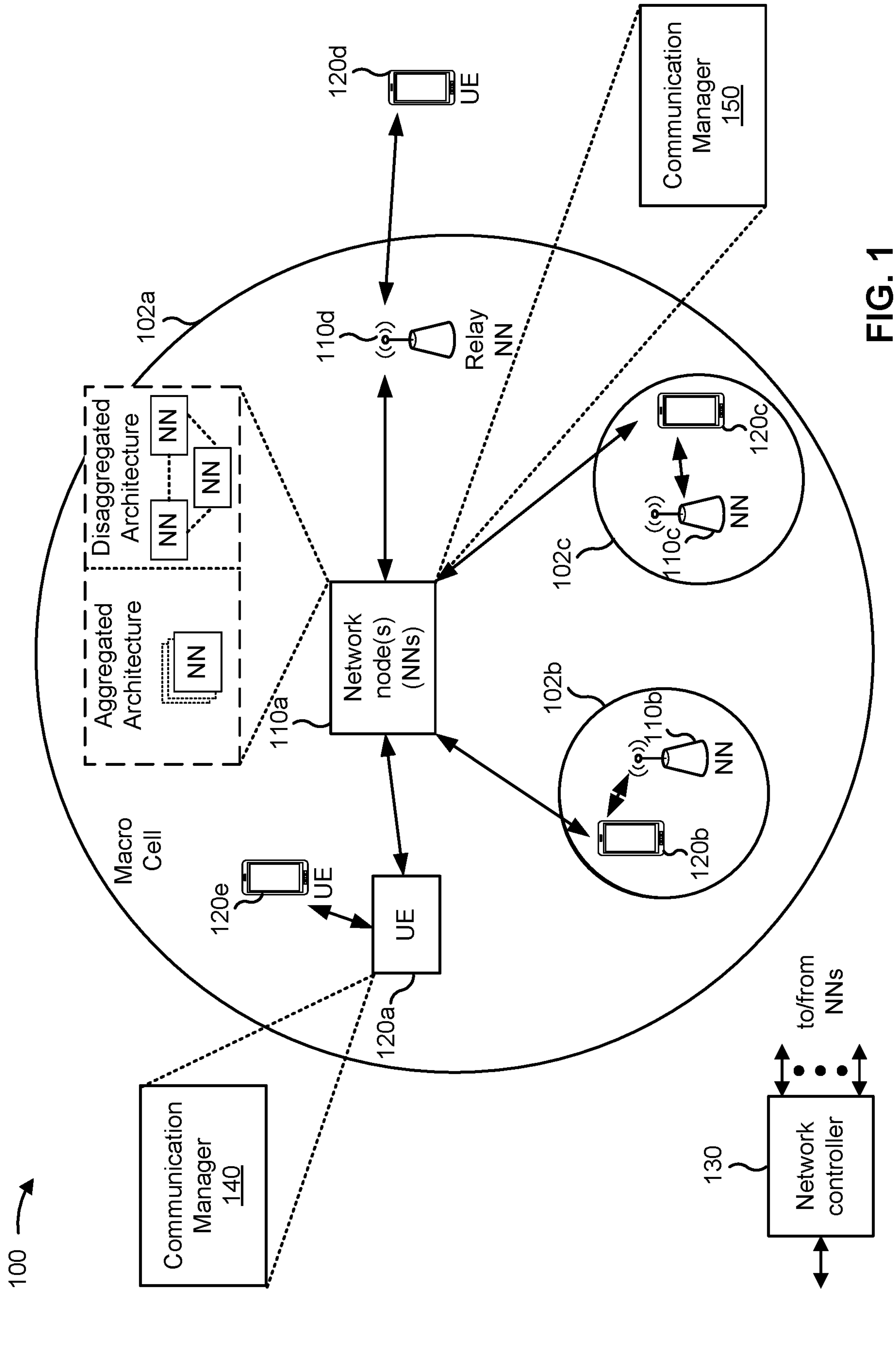
FIG. 1 is a diagram illustrating an example of a wireless network, in accordance with the present disclosure.

In some wireless communication systems, a user equipment (UE) may be configured to perform a layer 1 (L1)/layer 2 (L2) triggered mobility (LTM) procedure. In LTM, the UE may perform lower-layer measurements on multiple candidate cells and may report the measurements to a network node via a lower-layer (e.g., L1) measurement report. Based at least in part on the reported measurements, the network node may signal a cell switch command to the UE using lower-layer signaling, such as via downlink control information (DCI) or a medium access control (MAC) control element (MAC-CE). LTM procedures may result in reduced latency and reduced overhead as compared to layer 3 (L3) handover procedures, because LTM procedures do not require multiple radio resource control (RRC) reconfiguration messages and/or other L3 signaling and operations used to perform the L3 handover procedures. However, for LTM procedures in which the UE is configured to measure multiple beams for each candidate cell, the L1 measurement report may be large, because the L1 measurement report may include measurements associated with numerous candidate cells and beams. This may result in high signaling overhead and overall inefficient usage of network resources.

Some techniques and apparatuses described herein enable differential reporting for L1 measurement reports associated with LTM procedures. In differential reporting, a UE may report one or more full beam measurements to serve as one or more reference values, and the UE may report other beam measurements by indicating a difference (e.g., by indicating a delta) from one of the one or more reference values. In this way, by using differential reporting, signaling overhead for L1 measurement reports associated with LTM procedures may be reduced, resulting in decreased latency, increased throughput, and overall more efficient usage of network resources as compared to traditional LTM reporting procedures.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device.

In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, an unmanned aerial vehicle, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*e*) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHZ-7.125 GHZ) and FR2 (24.25 GHZ-52.6 GHZ). Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHZ), FR4 (52.6 GHZ-114.25 GHZ), and FR5 (114.25 GHZ-300 GHz). Each of these higher frequency bands falls within the EHF band.

With these examples in mind, unless specifically stated otherwise, the term "sub-6 GHz," if used herein, may broadly represent frequencies that may be less than 6 GHZ, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive configuration information that configures measurement of multiple candidate cells associated with an LTM procedure; perform measurements associated with the multiple candidate cells based at least in part on the configuration information; and transmit an L1 measurement report that reports the measurements associated with the multiple candidate cells based at least in part on differential reporting. In some other aspects, the communication manager 140 may receive configuration information that configures measurement of multiple candidate cells associated with an LTM procedure; receive a physical downlink control channel (PDCCH) order triggering a random access channel (RACH) procedure associated with a candidate cell, of the multiple candidate cells, that is indicated by the PDCCH order; and perform the RACH procedure associated with the candidate cell that is indicated by the PDCCH order by identifying at least one transmission parameter associated with the RACH procedure based at least in part on the configuration information. Additionally, or alternatively, the communication manager 140 may perform one or more other operations described herein.

In some aspects, the network node 110 may include a communication manager 150. As described in more detail elsewhere herein, the communication manager 150 may transmit, to a UE, configuration information that configures measurement of multiple candidate cells associated with an LTM procedure; and receive, from the UE, an L1 measurement report that reports the measurements associated with the multiple candidate cells based at least in part on differential reporting. In some other aspects, the communication manager 150 may transmit, to a UE, configuration information that configures measurement of multiple candidate cells associated with an LTM procedure; and transmit, to the UE, a PDCCH order triggering a RACH procedure associated with a candidate cell, of the multiple candidate cells, that is indicated by the PDCCH order, wherein a RACH procedure associated with the candidate cell that is indicated by the PDCCH order is based at least in part on at least one transmission parameter that is identified based at least in part on the configuration information. Additionally, or alternatively, the communication manager 150 may perform one or more other operations described herein.

As indicated above, FIG. 1 is provided as an example. Other examples may differ from what is described with regard to FIG. 1.

Figure 2:
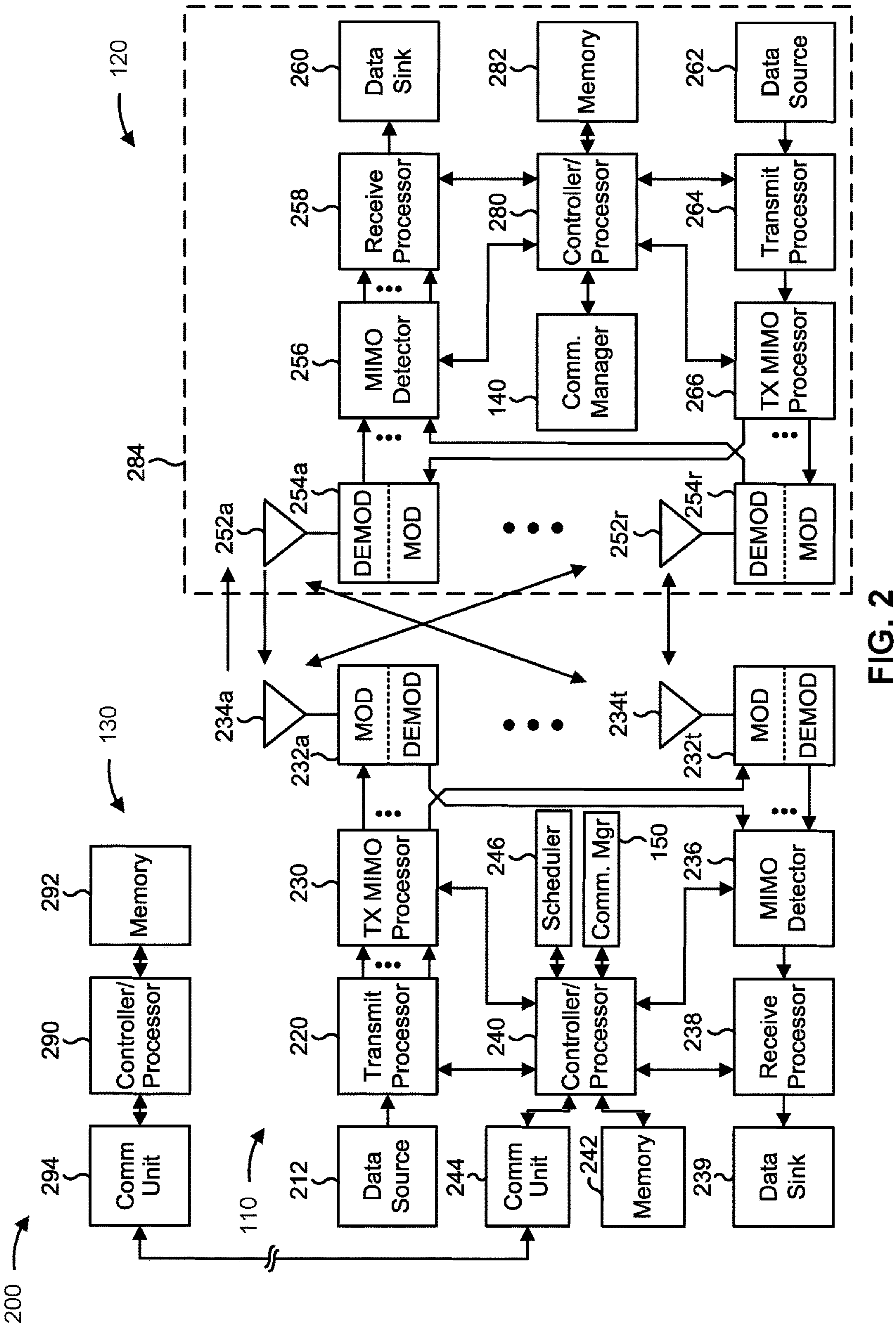
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The network node 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232*a* through 232*t*. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232*a* through 232*t* may transmit a set of downlink signals (for example, T downlink signals) via a corresponding set of antennas 234 (for example, T antennas), shown as antennas 234*a* through 234*t*.

At the UE 120, a set of antennas 252 (shown as antennas 252*a* through 252*r*) may receive the downlink signals from the network node 110 or other network nodes 110 and may provide a set of received signals (for example, R received signals) to a set of modems 254 (for example, R modems), shown as modems 254*a* through 254*r*. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234*a* through 234*t* or antennas 252*a* through 252*r*) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein (e.g., with reference to FIGS. 6-12).

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein (e.g., with reference to FIGS. 6-12).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, or any other component(s) of FIG. 2 may perform one or more techniques associated with LTM differential reporting, as described in more detail elsewhere herein. For example, the controller/processor 240 of the network node 110, the controller/processor 280 of the UE 120, or any other component(s) (or combinations of components) of FIG. 2 may perform or direct operations of, for example, process 700 of FIG. 7, process 800 of FIG. 8, process 900 of FIG. 9, process 1000 of FIG. 10, and/or other processes as described herein. The memory 242 and the memory 282 may store data and program codes for the network node 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 700 of FIG. 7, process 800 of FIG. 8, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for receiving configuration information that configures measurement of multiple candidate cells associated with an LTM procedure; means for performing measurements associated with the multiple candidate cells based at least in part on the configuration information; and/or means for transmitting an L1 measurement report that reports the measurements associated with the multiple candidate cells based at least in part on differential reporting. In some other aspects, the UE 120 includes means for receiving configuration information that configures measurement of multiple candidate cells associated with an LTM procedure; means for receiving a PDCCH order triggering a RACH procedure associated with a candidate cell, of the multiple candidate cells, that is indicated by the PDCCH order; and/or means for performing the RACH procedure associated with the candidate cell that is indicated by the PDCCH order by identifying at least one transmission parameter associated with the RACH procedure based at least in part on the configuration information. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting, to a UE, configuration information that configures measurement of multiple candidate cells associated with an LTM procedure; and/or means for receiving, from the UE, an L1 measurement report that reports the measurements associated with the multiple candidate cells based at least in part on differential reporting. In some other aspects, the network node 110 includes means for transmitting, to a UE, configuration information that configures measurement of multiple candidate cells associated with an LTM procedure; and/or means for transmitting, to the UE, a PDCCH order triggering a RACH procedure associated with a candidate cell, of the multiple candidate cells, that is indicated by the PDCCH order, wherein a RACH procedure associated with the candidate cell that is indicated by the PDCCH order is based at least in part on at least one transmission parameter that is identified based at least in part on the configuration information. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
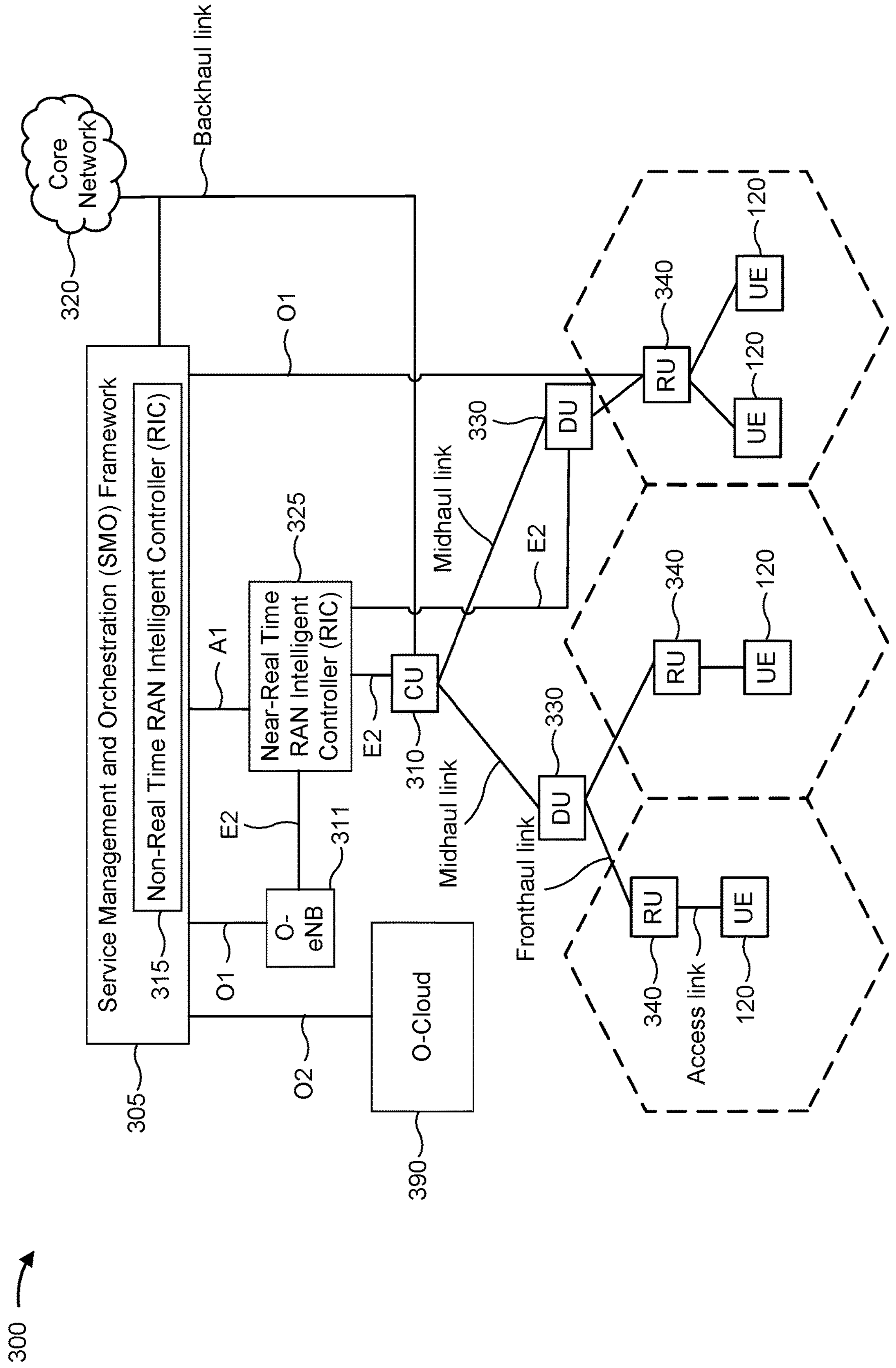
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include RRC functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUS 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
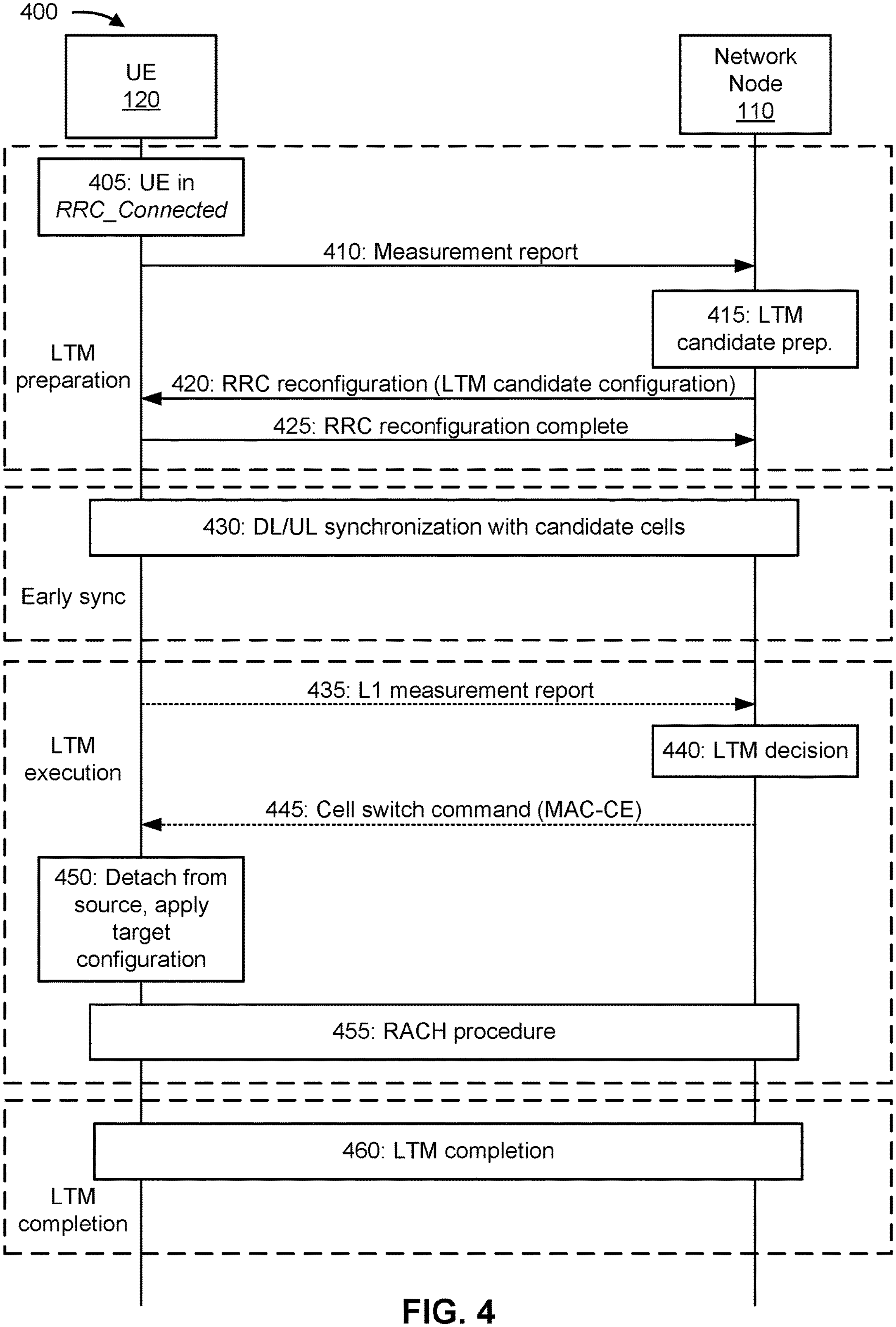
FIG. 4 is a diagram illustrating an example of a layer 1/layer 2 triggered mobility (LTM) procedure, in accordance with the present disclosure.

FIG. 4 is a diagram illustrating an example 400 of an LTM procedure, in accordance with the present disclosure.

In some examples, a network node 110 may instruct a UE 120 to change serving cells, such as when the UE 120 moves away from coverage of a current serving cell (sometimes referred to as a source cell) and towards coverage of a neighboring cell (sometimes referred to as a target cell). In some cases, the network node 110 may instruct the UE 120 to change cells using an L3 handover procedure. An L3 handover procedure may include the network node 110 transmitting, to the UE 120, an RRC reconfiguration message indicating that the UE 120 should perform a handover procedure to a target cell, which may be transmitted in response to the UE 120 providing the network node 110 with an L3 measurement report indicating signal strength measurements associated with various cells (e.g., measurements associated with the source cell and one or more neighboring cells). In response to receiving the RRC reconfiguration message, the UE 120 may communicate with the source cell and the target cell to detach from the source cell and connect to the target cell (e.g., the UE 120 may establish an RRC connection with the target cell). Once handover is complete, the target cell may communicate with a user plane function (UPF) of a core network to instruct the UPF to switch a user plane path of the UE 120 from the source cell to the target cell. The target cell may also communicate with the source cell to indicate that handover is complete and that the source cell may be released.

L3 handover procedures may be associated with high latency and high overhead due to the multiple RRC reconfiguration messages and/or other L3 signaling and operations used to perform the handover procedures. Accordingly, in some examples, a UE 120 may be configured to perform a lower-layer (e.g., L1 and/or L2) handover procedure, sometimes referred to an LTM procedure, such as the example 400 LTM procedure shown in FIG. 4. As shown in FIG. 4, the LTM procedure may include four phases: an LTM preparation phase, an early synchronization phase (shown as "early sync" in FIG. 4), an LTM execution phase, and/or an LTM completion phase.

During the LTM preparation phase, and as indicated by reference number 405, the UE 120 may be in an RRC connected state (sometimes referred to as RRC_Connected) with a source cell. As indicated by reference number 410, the UE 120 may transmit, and the network node 110 may receive, a measurement report (sometimes referred to as a MeasurementReport), which may be an L3 measurement report. The measurement report may indicate signal strength measurements (e.g., RSRP, RSSI, RSRQ, and/or CQI) or similar measurements associated with the source cell and/or one or more neighboring cells. In some examples, based at least in part on the measurement report or other information, the network node 110 may decide to use LTM, and thus, as indicated by reference number 415, the network node 110 may initiate LTM candidate preparation.

As shown by reference number 420, the network node 110 may transmit, and the UE 120 may receive, an RRC reconfiguration message (sometimes referred to as an RRCReconfiguration message), which may include an LTM candidate configuration. More particularly, the RRC reconfiguration message may indicate a configuration of one or more LTM candidate target cells, which may be candidate cells to become a serving cell of the UE 120 and/or cells for which the UE 120 may later be triggered to perform an LTM procedure. As shown by reference number 425, the UE 120 may store the configuration of the one or more LTM candidate cell configurations and, in response, may transmit, to the network node 110, an RRC reconfiguration complete message (sometimes referred to as an RRCReconfiguration-Complete message).

During the early synchronization phase, and as indicated by reference number 430, the UE 120 may optionally perform downlink/uplink synchronization with the candidate cells associated with the one or more LTM candidate cell configurations. For example, the UE 120 may perform downlink synchronization and timing advance acquisition with the one or more candidate target cells prior to receiving an LTM switch command (which is described in more detail below in connection with reference number 445). In some aspects, performing the early synchronization with the one or more candidate cells may reduce latency associated with performing a random access channel (RACH) procedure later in the LTM procedure, which is described in more detail below in connection with reference number 455.

During the LTM execution phase, and as indicated by reference number 435, the UE 120 may perform L1 measurements on the configured LTM candidate target cells, and thus may transmit, to the network node 110, lower-layer (e.g., L1) measurement reports. As indicated by reference number 440, based at least in part on the lower-layer measurement reports, the network node 110 may decide to execute an LTM cell switch to a target cell. Accordingly, as shown by reference number 445, the network node 110 may transmit, and the UE 120 may receive, a MAC-CE or similar message triggering an LTM cell switch (the MAC-CE or similar message is sometimes referred to herein as a cell switch command). The cell switch command may include an indication of a candidate configuration index associated with the target cell. As shown by reference number 450, based at least in part on receiving the cell switch command, the UE 120 may switch to the configuration of the LTM candidate target cell (e.g., the UE 120 may detach from the source cell and apply the target cell configuration). Moreover, as shown by reference number 455, the UE 120 may perform a RACH procedure towards the target cell, such as when a timing advance associated with the target cell is not available (e.g., in examples in which the UE 120 did not perform the early synchronization as described above in connection with reference number 430).

During the LTM completion phase, and as indicated by reference number 460, the UE 120 may indicate successful completion of the LTM cell switch towards the target cell. In this way, cell switch to a target cell may be performed using less overhead than for an L3 handover procedure and/or a cell switch to a target cell may be associated with reduced latency as compared to L3 handover procedure. Aspects of various scenarios (e.g., various target cells) associated with the LTM procedure are described in more detail below in connection with FIGS. 5A-5C.

As indicated above, FIG. 4 is provided as an example. Other examples may differ from what is described with respect to FIG. 4.

Figure 5A:
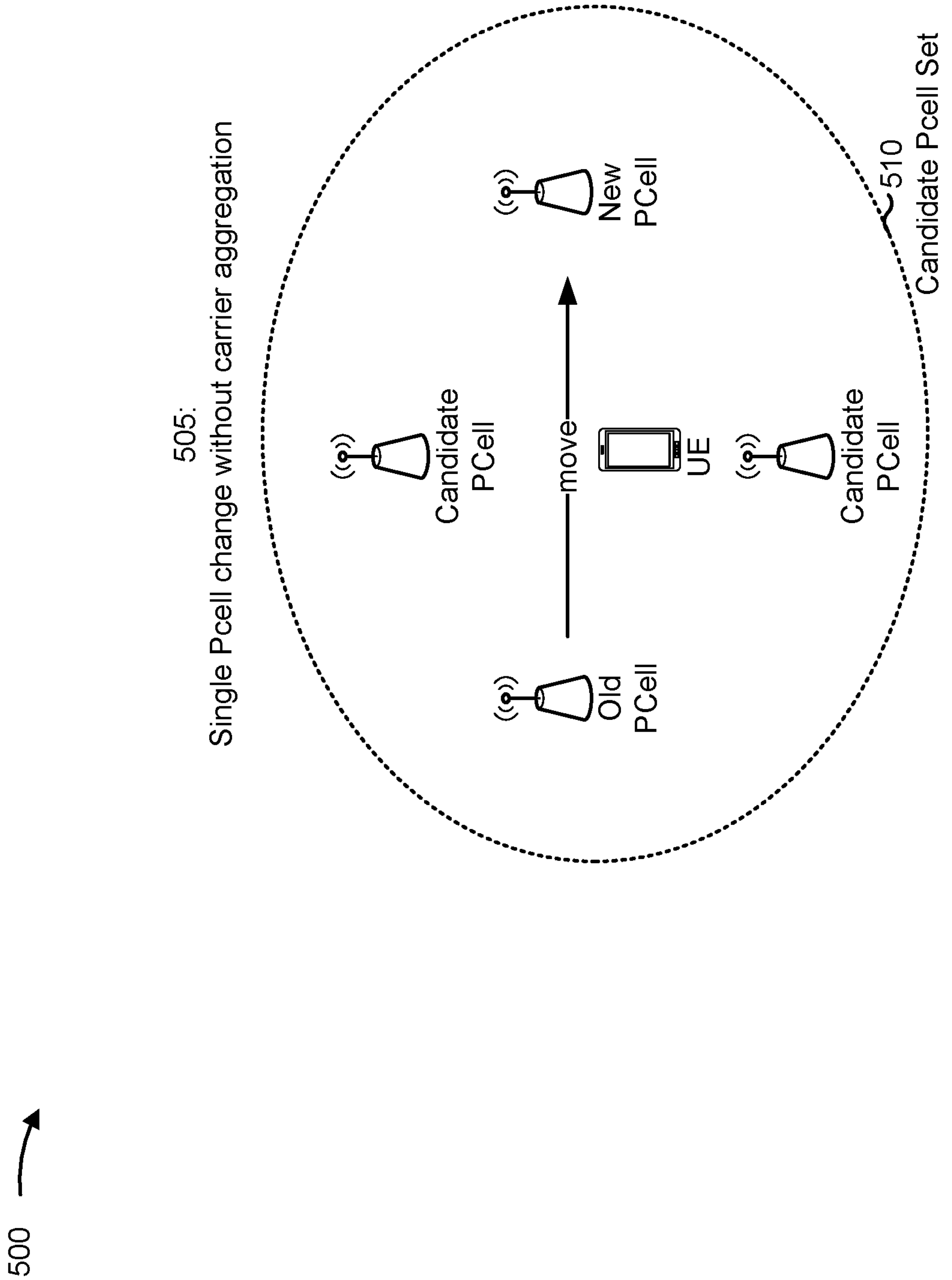
FIGS. 5A-5C are diagrams illustrating an example of cell or cell group changes using an LTM procedure, in accordance with the present disclosure.
Figure 5B:
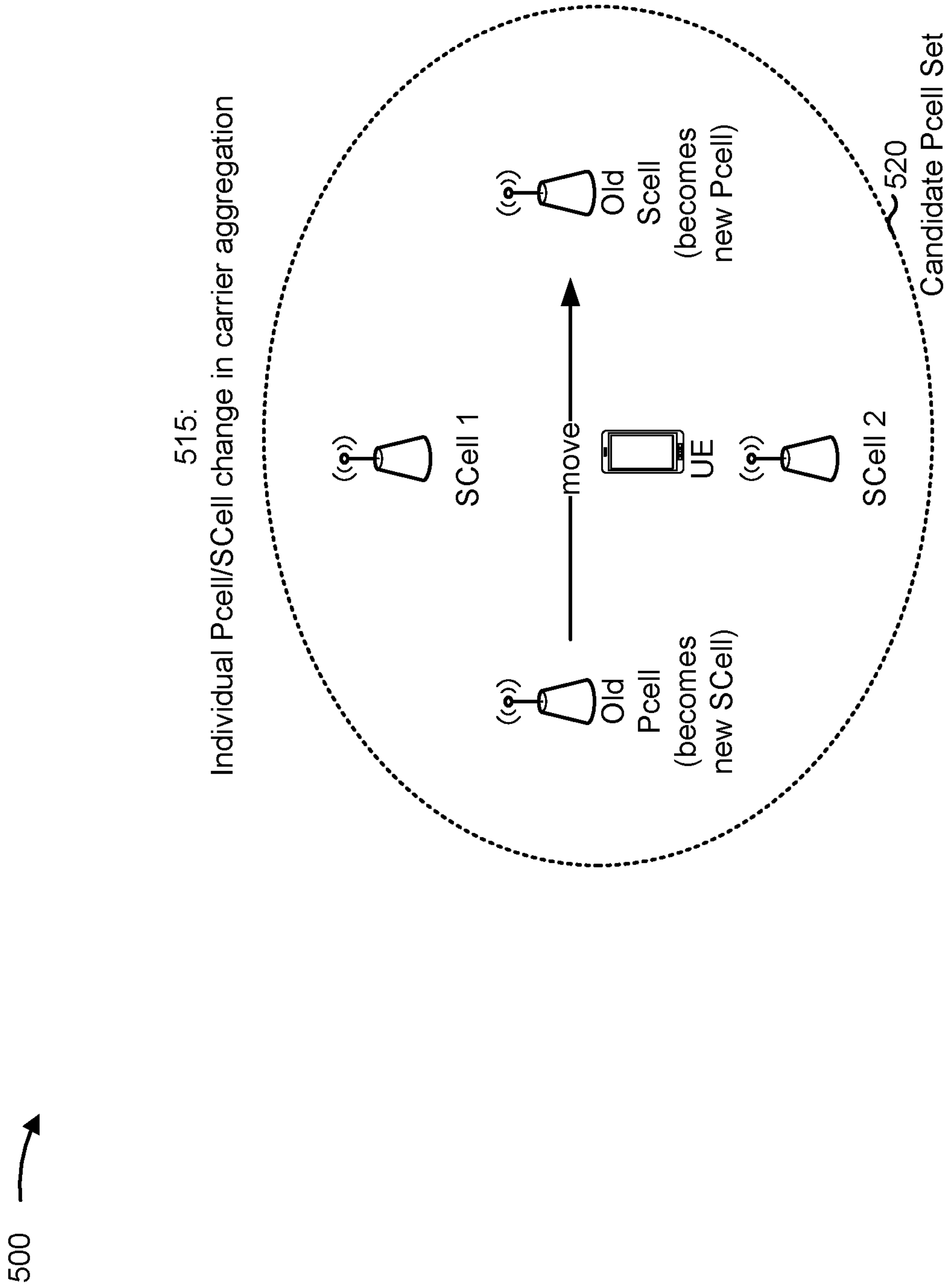
Figure 5C:
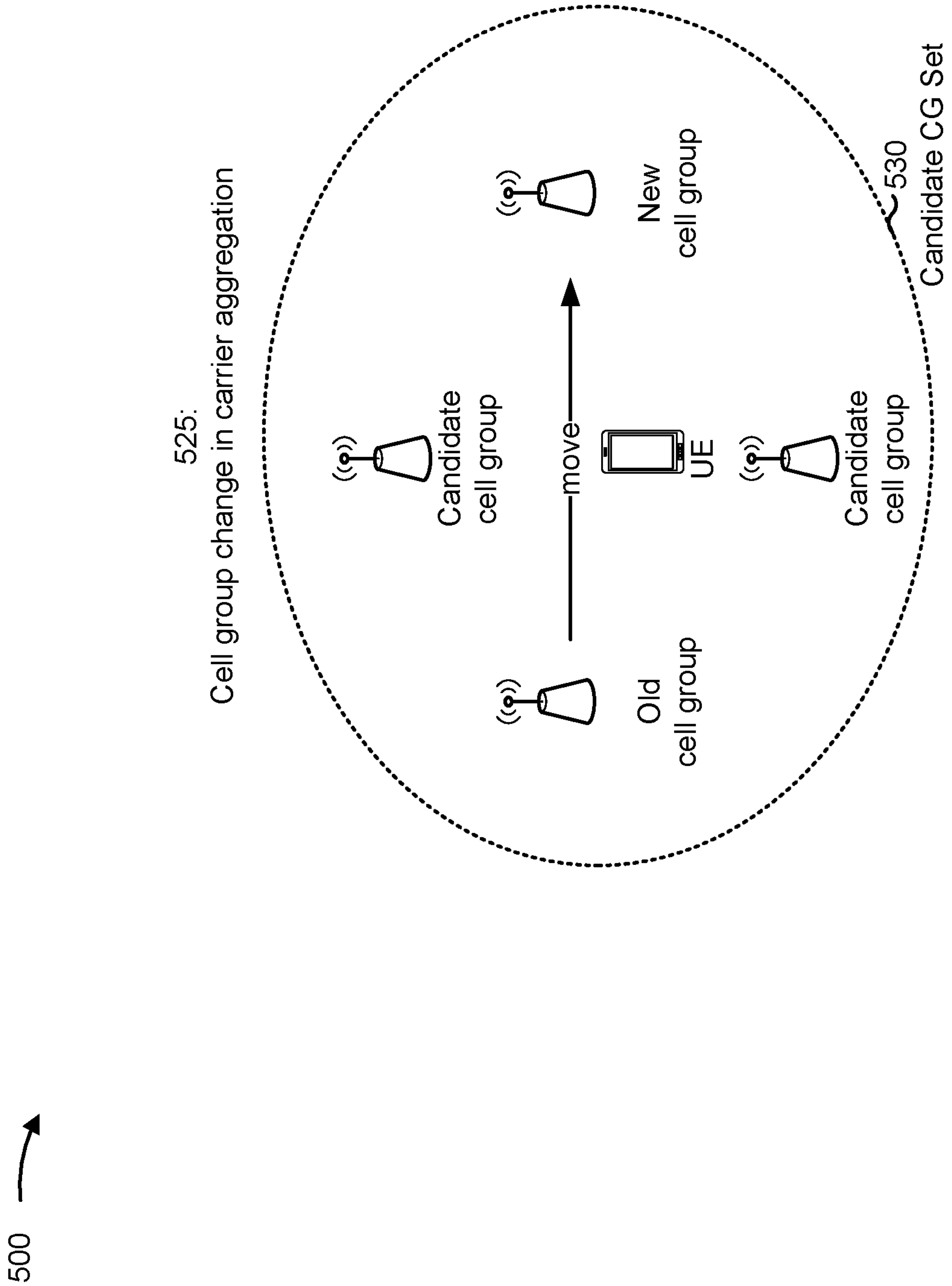

FIGS. 5A-5C are diagrams illustrating an example 500 of cell or cell group changes using an LTM procedure, in accordance with the present disclosure.

In some aspects, an LTM procedure, such as the LTM procedure described above in connection with FIG. 4, may be used to change a primary cell (PCell) associated with a UE 120, a secondary cell (SCell) associated with a UE 120, a cell group associated with a UE 120, or a similar scenario. For example, as shown in FIG. 5A, and as indicated by reference number 505, the LTM procedure may be used for a purpose of performing a single PCell change without carrier aggregation. In such examples, a UE 120 may be configured (e.g., via the LTM candidate configuration message described above in connection with reference number 420) with multiple candidate PCells, such as the candidate PCell set indicated by reference number 510. In such examples, a single PCell without carrier aggregation and/or dual-connectivity may be selected from the candidate PCell set to serve as the new PCell. Accordingly, based at least in part on lower layer signaling (e.g., DCI and/or a MAC-CE), the UE 120 may perform a handover procedure to an indicated candidate PCell from the candidate PCell set.

As shown in FIG. 5B, and as indicated by reference number 515, in some other examples the LTM procedure may be used for a purpose of performing an individual PCell/SCell change in carrier aggregation. In such examples, a UE 120 may be configured (e.g., via the LTM candidate configuration message described above in connection with reference number 420) with multiple candidate PCells, such as the candidate PCell set indicated by reference number 520. In this example, the candidate PCells may include SCells associated with the UE 120. In such examples, a PCell change may be implemented by performing a PCell-SCell swap among the candidate PCell set. More particularly, a source PCell may become an SCell (and thus become a candidate PCell for future LTM procedures), and one of the candidate PCells (e.g., an SCell, which may be indicated by DCI and/or a MAC-CE) may become a PCell. In some examples, the single PCell change without carrier aggregation procedure described in connection with FIG. 5A and/or the individual PCell/SCell change in carrier aggregation procedure as described in connection with FIG. 5B may be referred to as individual cell selection procedures and/or class 1 LTM procedures.

As shown in FIG. 5C, and as indicated by reference number 525, in some other examples the LTM procedure may be used for a purpose of performing cell group (CG) change in carrier aggregation. In such examples, a UE 120 may be configured (e.g., via the LTM candidate configuration message described above in connection with reference number 420) with multiple candidate CGs, such as the candidate CG set indicated by reference number 530. Each CG may include multiple cells, such as a PCell (sometimes referred to as a special cell (SpCell)) and one or more associated SCells. In such examples, a CG may be selected from the candidate CG set to serve as a new CG for the UE 120. Accordingly, based at least in part on lower layer signaling (e.g., DCI and/or a MAC-CE), the UE 120 may switch from one CG to an indicated candidate CG from the candidate CG set. In some examples, the CG change in carrier aggregation procedure described in connection with FIG. 5C may be referred to as a CG-based selection procedure and/or a class 2 LTM procedure.

In some examples, measurements associated with one or more candidate cells and/or CGs may be reported by a UE 120 to a network node 110 via an L1 report, such as the L1 measurement report described above in connection with reference number 435. In some examples, the L1 measurement report may be referred to as an L1-RSRP measurement report and/or a synchronization signal block (SSB) based L1-RSRP measurement report because the measurements may be associated with RSRP measurements performed using SSBs transmitted by each candidate cell. Moreover, in some aspects, the LTM procedure may be associated with beam selection across multiple beams associated with multiple cells. For example, an LTM procedure may be associated with beam selection across M beams for each of L cells associated with a configured candidate cell set (e.g., L cells configured by the LTM candidate configuration message described above in connection with reference number 420). In such examples, an L1 measurement report may include reported measurements for up to M×L beams. In some examples, maximum values of M and/or L may be based at least in part on a UE 120 capability, and/or the values of M and/or L may be configured to the UE 120 in the reporting configuration (e.g., LTM candidate configuration message described above in connection with reference number 420).

In such examples, the L1 measurement report may be large, because the L1 measurement report may include measurements associated with numerous cells and/or beams. Accordingly, it may be desirable to use differential reporting by the UE 120 in order to reduce signaling overhead associated with the L1 measurement report. In differential reporting, the UE 120 may report one or more measurements as full measurements (e.g., the UE 120 may report an absolute value of one or more measurements) to serve as one or more reference values (e.g., the UE 120 may report a highest RSRP associated with all candidate cells and/or beams as a full value to serve as a reference value), and the UE 120 may report other measurements (e.g., other RSRPs) by indicating a difference (e.g., by indicating a delta) from one of the one or more reference values. Traditionally, differential reporting has been available only for reporting measurements associated with a single cell, such as an L1

RSRP and/or signal-to-interference-plus-noise ratio (SINR) report associated with a single cell. However, as described above, an L1 measurement report associated with an LTM procedure may need to report measurements associated with multiple cells and/or multiple beams per cell, making traditional differential reporting unsuitable for LTM reporting. Accordingly, traditional L1 measurement reports may be associated with high overhead and inefficient usage of network resources.

Some techniques and apparatuses described herein enable differential reporting for L1 measurement reports associated with LTM procedures. In some aspects, a UE 120 may be configured to measure multiple candidate cells associated with an LTM procedure (e.g., the UE 120 may receive an LTM candidate configuration), and the UE 120 may thus perform measurements associated with the multiple candidate cells based at least in part on the configuration. In some aspects, the configuration may configure one or more differential LTM reports, such that the UE 120 transmits an L1 measurement report that reports the measurements associated with the multiple candidate cells based at least in part on differential reporting. By using differential reporting to report L1 measurements associated with an LTM procedure, smaller L1 measurement reports may be transmitted by the UE 120, thereby reducing signaling overhead, resulting in decreased latency, increased throughput, and overall more efficient usage of network resources, as compared to traditional LTM reporting procedures.

As indicated above, FIGS. 5A-5C are provided as an example. Other examples may differ from what is described with respect to FIGS. 5A-5C.

Figure 6:
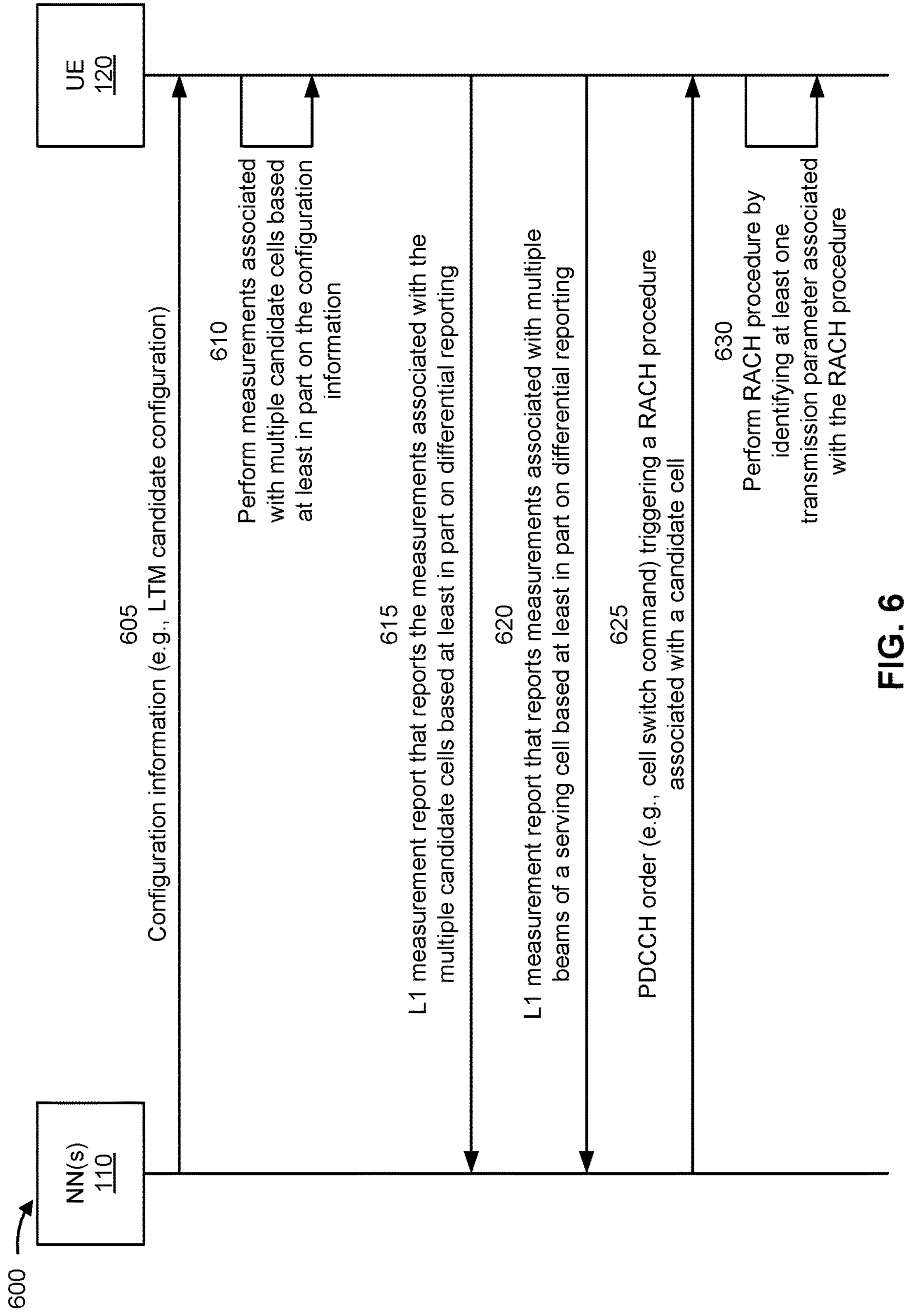
FIG. 6 is a diagram of an example associated with LTM differential reporting, in accordance with the present disclosure.

FIG. 6 is a diagram of an example 600 associated with LTM differential reporting, in accordance with the present disclosure. As shown in FIG. 6, a network node 110 (e.g., a CU, a DU, and/or an RU) may communicate with a UE 120. In some aspects, the network node 110 and the UE 120 may be part of a wireless network (e.g., wireless network 100). The UE 120 and the network node 110 may have established a wireless connection prior to operations shown in FIG. 6. In some aspects, the network node 110 and/or the UE 120 may have a capability to perform an LTM procedure, such as the LTM procedure described above in connection with FIG. 4.

As shown by reference number 605, the network node 110 may transmit, and the UE 120 may receive, configuration information. In some aspects, the UE 120 may receive the configuration information via one or more of RRC signaling, one or more MAC-CEs, and/or DCI, among other examples. In some aspects, the configuration information may include an indication of one or more configuration parameters (e.g., already known to the UE 120 and/or previously indicated by the network node 110 or other network device) for selection by the UE 120, and/or explicit configuration information for the UE 120 to use to configure the UE 120, among other examples.

In some aspects, the configuration information may configure measurement of multiple candidate cells associated with an LTM procedure. In that regard, the configuration information may be the LTM candidate configuration message described above in connection with reference number 420, and/or the configuration information may include some of the information described above in connection with reference number 420. In some aspects, the configuration may configure measurement of multiple beams associated with each candidate cell. For example, as described above in connection with FIGS. 5A-5C, the configuration information may configure measurement of multiple (e.g., M) candidate cells, with each candidate cell being associated with multiple (e.g., L) beams to be measured by the UE 120.

In some aspects, the configuration information may configure an L1 measurement report, such as the L1 measurement report described above in connection with reference number 435 or a similar L1 measurement report. Moreover, in some aspects, the configuration information may configure the UE 120 to report measurements associated with the candidate cells and/or beams associated with the candidate cells using differential reporting. As described above in connection with FIGS. 5A-5C, differential reporting may include the UE 120 reporting a reference value (e.g., an absolute value) of one or more measurements (e.g., an absolute value of a strongest-measured beam) and differential values (e.g., deltas with respect to a reference value) of other measurements (e.g., measurements associated with beams other than the strongest-measured beam). Aspects of reporting measurements associated with the candidate cells and/or beams associated with the candidate cells using differential reporting are described in more detail below in connection with reference numbers 615 and 620.

The UE 120 may configure itself based at least in part on the configuration information. In some aspects, the UE 120 may be configured to perform one or more operations described herein based at least in part on the configuration information.

As shown by reference number 610, the UE 120 may perform measurements associated with the multiple candidate cells based at least in part on the configuration information. Moreover, in aspects in which the configuration information configures measurement of multiple beams associated with the multiple candidate cells (e.g., L beams associated with the M candidate cells), with each candidate cell being associated with a respective subset of beams, the UE 120 may perform measurements associated with the multiple beams based at least in part on the configuration information. In some aspects, the measurements may be associated with measuring a signal strength of a reference signal associated with a candidate cell and/or a beam of a candidate cell. For example, in some aspects, the UE 120 may perform RSRP measurements on reference signals associated with each beam of each candidate cell (e.g., reference signals contained within an SSB transmitted using a beam of a candidate). In some other aspects, the UE 120 may perform RSRQ measurements, SINR measurements, RSSI measurements, CQI measurements, or similar measurements on reference signals associated with each beam of each candidate cell.

As shown by reference number 615, the UE 120 may transmit, and the network node 110 may receive, an L1 measurement report that reports the measurements associated with the multiple candidate cells and/or the multiple beams (e.g., the L1 measurement report may report measurements associated with the L beams of the M candidate cells), which may be similar to the L1 measurement report described above in connection with reference number 435. In some aspects, such as in aspects in which the network node 110 configured the UE 120 to report the candidate cell and/or beam measurements using differential reporting, the L1 measurement report may report the measurements associated with the multiple candidate cells and/or the multiple beams based at least in part on differential reporting. For example, the L1 measurement report may indicate a reference value of one or more measurements (e.g., a reference value of a strongest-measured beam and/or another measurement) and/or the L1 measurement report may include one or more differential values (e.g., deltas with respect to a reference value) of other measurements (e.g., measurements associated with beams other than the strongest-measured beam and/or another measurement).

In some aspects, the L1 measurement report may indicate a reference value of a measurement associated with a strongest-measured beam, of the multiple beams, as well as differential values, with respect to the reference value, of measurements associated with each other beam, of the multiple beams, that is not the strongest-measured beam. Put another way, a metric (e.g., an RSRP value) associated with a strongest reference signal and/or beam may be reported as a full, absolute value to serve as a reference value in the L1 measurement report, and all other metrics in the L1 measurement report may be reported in differential form (e.g., as a delta with respect to the reference value of the strongest reference signal and/or beam).

In some aspects, the measurements of all reported beams in the L1 measurement report (e.g., the M×L beams) may be sorted according to their respective measurement values, with a largest measurement value being reported first and all remaining measurement values being reported thereafter in descending order of size. For example, in some aspects, the L1 measurement report may indicate the reference value (e.g., the measurement value associated with the strongest-measured beam) first in a list of measurements, and then may indicate the differential values (e.g., the measurement values associated with the remaining beams) second in the list of measurements by listing the differential values in descending order of size.

In such aspects, each reference signal, beam, and/or corresponding measurement value may be associated with an indicator in order to indicate, to the network node 110, which measurement value corresponds to which beam. For example, in some aspects, each beam may be associated with a global resource indicator, which may be an indicator that uniquely identifies the beam among all beams associated with the LTM procedure and/or the L1 measurement report. In some aspects, the global resource indicator may be an SSB resource indicator (SSBRI), a channel state information reference signal resource indicator (CRI), or a similar global resource indicator. In some aspects, the global resource indicator may be associated with a global reference signal identifier within a set of resources associated within the L1 measurement report configuration (e.g., indicated by the configuration information described above in connection with reference number 605). In some other aspects, the global resource indicator may be a global reference signal order identifier across all reference signals (e.g., across all beams) and measured candidate cells associated with the L1 measurement report configuration. For example, the reference signal order identifier may be based on a configured order of the candidate cells and corresponding reference signals (e.g., beams) for the L1 measurement report configuration. In such aspects, the L1 measurement report may indicate, for each beam (e.g., for each measurement value associated with each beam), a respective global resource indicator.

In some other aspects, each beam may be associated with a local resource indicator, which may be an indicator that uniquely identifies the beam among all beams associated with a particular candidate cell, but which may not uniquely identify the beam among all beams associated with an LTM procedure or among all beams associated with the L1 measurement report. Put another way, a local resource indicator may be reused with respect to each candidate cell. In such aspects, the L1 measurement report may indicate, for each beam, a respective cell identifier (e.g., a physical channel identity (PCI), a logical candidate cell identifier, or a similar cell identifier) for a cell associated with the beam, and a respective local resource indicator (e.g., an SSB identifier for the particular candidate cell) indicating the beam within the respective cell.

In some other aspects, the L1 measurement report may sort the reported measurement values by grouping the measurement values according to candidate cells. For example, the L1 measurement report may indicate a list of multiple groups of beam measurements, with each group of beam measurements being associated with a respective candidate cell. In such aspects, the L1 measurement report may indicate, for each group of beam measurements, a subset of the differential values, which are associated with the respective candidate cell, in descending order of size. Moreover, the groups of beam measurements may be sorted in the L1 measurement report such that a group of beam measurements that includes a strongest-measured beam is indicated first in the L1 measurement report (e.g., the first beam of the first cell listed in the L1 measurement report may be the strongest-measured beam, which may be reported as the reference value, with the remaining beams reported as differential values). Put another way, the L1 measurement report may indicate a group of beam measurements that includes the reference value first in the list of multiple groups of beam measurements.

In such aspects, in order to identify each group of beam measurements and/or each beam within the groups of beam measurements, the L1 measurement report may indicate one or more resource indicators associated with each measurement value. For example, in aspects in which each beam is associated with a global resource indicator (e.g., an SSBRI, a CRI, or a similar global resource indicator, as described above), the L1 measurement report may indicate, for each beam, a respective global resource indicator. In aspects in which in which each beam is associated with a local resource indicator, the L1 measurement report may indicate, for each group of beam measurements, a respective cell identifier, and, for each beam within each group of beam measurements, a respective local resource indicator.

In some other aspects, the group of beam measurements that is associated with the strongest-measured beam (e.g., the group of beam measurements that includes the reference value) may not necessarily be listed first out of all of the groups of beam measurements. Instead, the L1 measurement report may include a field or similar indicator that indicates which candidate cell and/or beam is associated with the strongest-measured beam (e.g., the L1 measurement report may include a field that indicates a beam measurement that is associated with the reference value). For example, the L1 measurement report may list the multiple groups of beam measurements in sequential order according to cell identifiers or similar logical identifiers, and may include a field indicating which candidate cell and/or beam is associated with the reference value. For example, the field may indicate that a certain reported candidate cell's first beam is the reference value, and/or the field may indicate that a certain beam in the L1 measurement report is the reference value.

In some aspects, the L1 measurement report may report measurements associated with a serving cell of the UE 120 (e.g., the L1 measurement report may indicate a group of beam measurements associated with a serving cell). In such aspects, the L1 measurement report may indicate the group of beam measurements associated with the serving cell in a fixed location within the L1 measurement report. For example, the L1 measurement report may indicate the group of beam measurements associated with the serving cell first in the list of multiple groups of beam measurements included in the L1 measurement report. In such aspects, the L1 measurement report may omit a cell identifier or similar identifier associated with the group of beam measurements associated with the serving cell, such as for a purpose of reducing overhead associated with the L1 measurement report. Put another way, when a group of beam measurements associated with the serving cell is included in a fixed location in the L1 measurement report (e.g., first in the L1 measurement report), the network node 110 may identify that the group of beam measurements is associated with the serving cell even without an indication of an associated cell identifier or similar identifier, and thus the UE 120 may omit the cell identifier to reduce signaling overhead.

In some aspects, when a group of beam measurements associated with the serving cell is included in the L1 measurement report, the L1 measurement report may include two reference values (e.g., two full measurement values and/or absolute values), one associated with a strongest-measured beam of the serving cell (with measurements associated with all other beams of the serving cell being reported as differential values) and one associated with a strongest-measured beam across all candidate cells (with measurements associated with all other beams across the candidate cells being reported as differential values). In such aspects, in addition to the reference value described above (e.g., the measurement value associated with the strongest-measured beam across the candidate cells), the L1 measurement report may indicate another reference value of a measurement associated with a strongest-measured beam of the serving cell. Similarly, in addition to the differential values described above (e.g., the measurement values associated with the other beams across the candidate cells), the L1 measurement report may indicate other differential values, with respect to the other reference value, of measurements associated with each other beam of the serving cell that is not the strongest-measured beam of the serving cell.

In some aspects, when measurements associated with the serving cell are to be reported by the UE 120, the UE 120 may report the serving cell measurements using a same L1 measurement report as is used to report measurements associated with the candidate cells (e.g., the L1 measurement report described above in connection with reference number 615), while, in some other aspects, the UE 120 may report the serving cell measurements using a different L1 measurement report than the L1 measurement report used to report measurements associated with the candidate cells. For example, in some aspects, serving cell measurements may always be reported by the UE 120 (e.g., the UE 120 may be hard-coded, specified, and or pre-configured to always report serving cell measurements). In such aspects, the UE 120 may perform separate differential reporting for the serving cell and the candidate cells. For example, as shown by reference number 620, the UE 120 may transmit, and the network node 110 may receive, another L1 measurement report that reports measurements associated with multiple beams of the serving cell based at least in part on differential reporting. In some aspects, when another L1 measurement report is used to report measurements associated with the serving cell, certain indicators may be omitted from the other L1 measurement report in order to reduce signaling overhead, such as a serving cell identifier and/or a resource indicator associated with one or more serving cell beams.

In some other aspects, such as in aspects in which the serving cell measurements are not always reported (e.g., in which the UE 120 is not hard-coded, specified, and or pre-configured to always report serving cell measurements), but in which the UE 120 is configured to report serving cell measurements in a particular instance (e.g., via the configuration information described above in connection with reference number 605), the UE 120 may report the serving cell measurements with the candidate cell measurements (e.g., the L1 measurement report used to report the candidate cell measurements may also indicate measurements associated with multiple beams of the serving cell based at least in part on differential reporting). In such aspects, a cell identifier and/or a resource indicator may be reported for each measurement indicated by the L1 measurement report.

In some aspects, the L1 measurement report may include multiple reference values (e.g., multiple full measurement values and/or absolute values), one for each candidate cell, with the remaining beam measurement values for each candidate cell being reported as differential values with respect to the reference value for that cell. More particularly, a strongest-measured beam (e.g., a strongest RSRP value) of each candidate cell may be reported as a reference value, and the remaining measurement values (e.g., the remaining RSRP values) for the candidate cell may be reported in differential form with respect to that cell's reference value. Put another way, the L1 measurement report may indicate, for each candidate cell, a reference value of a measurement associated with a strongest-measured beam, of the beams associated with the candidate cell, and differential values, with respect to the absolute value, of measurements associated with each other beam that is not the strongest-measured beam for the candidate cell. In such aspects, an order of the candidate cells in the report may be based at least in part on a predefined order, such as based at least in part on an increasing or decreasing order of cell identifiers.

In some other aspects, the L1 measurement report may be associated with double differential reporting. More particularly, the L1 measurement report may indicate a full measurement value of an overall strongest-measured beam, of all beams associated with all candidate cells (of all M×L beams), as the reference value (e.g., the absolute value), and the L1 measurement report may indicate a measurement value of a strongest-measured beam of each candidate cell (if not the overall strongest-measured beam) as a differential value with respect to the overall strongest-measured beam. Moreover, the L1 measurement report may indicate measurement values of all remaining beams as differential values with respect to the strongest-measured beam of a corresponding candidate cell. Put another way, the L1 measurement report may indicate a reference value of a measurement associated with a strongest-measured beam of all beams associated with the LTM candidate configuration, the L1 measurement report may indicate, for each candidate cell that does not include the strongest-measured beam, a differential value, with respect to the reference value, of a measurement associated with a strongest-measured beam of the candidate cell, and the L1 measurement report may indicate, for each candidate cell, differential values, with respect to a value of the measurement associated with the strongest-measured beam of the respective candidate cell, of measurements associated with each other beam that is not the strongest-measured beam of the candidate cell.

In some aspects, the L1 measurement report may indicate which measurement value is associated with a strongest-measured beam (e.g., which measurement value is the reference value), such as by including the measurement value associated with a strongest-measured beam in a specific location and/or by including an explicit indication of which measurement value is associated with the strongest-measured beam. More particularly, in some aspects, the measurement value associated with the strongest-measured beam may be included in a fixed location in the L1 measurement report, such as a first reported measurement value (e.g., the first reported RSRP value) in the L1 measurement report. Put another way, the L1 measurement report may indicate that a measurement is associated with a strongest-measured beam, of the multiple beams, based at least in part on including the measurement associated with the strongest-measured beam at a specific location within the L1 measurement report (e.g., as a first-listed measurement in the L1 measurement report).

In some other aspects, the measurement values may be sequentially arranged (e.g., measurement values associated with the beams may be sorted sequentially based at least in part on a resource indicator or similar identifier) or similarly arranged within the L1 measurement report, and the L1 measurement report may include an explicit indication of where in the L1 measurement report a measurement value that is associated with the strongest-measured beam is included. Put another way, the L1 measurement report may indicate measurements associated with the multiple beams in a specific order based at least in part on respective beam identifiers associated with the multiple beams, and/or the L1 measurement report may indicate a location of a measurement associated with a strongest-measured beam, of the multiple beams (e.g., the L1 measurement report may explicitly indicate that a certain measurement value is associated with the strongest-measured beam and/or the reference value, with the remaining measurement values being reported in differential form).

In some aspects, certain candidate cells may be associated with varying numbers of beams. For example, the UE 120 may be configured to measure a first candidate cell associated with a first number of beams (e.g., a first candidate cell may have 32 SSBs configured for the report) and a second candidate cell associated with a second number of beams (e.g., a second candidate cell may have more or less than 32 SSBs configured for the report, such as 8 SSBs configured for the report). In such aspects, when the L1 measurement report indicates a local resource indicator identifier or similar identifier for each reported measurement, a size of a field necessary for each candidate cell may differ. For example, in the example described above, a local resource indicator field associated with the first candidate cell may need to be at least five bits in order to indicate one of 32 unique identifiers, while a local resource indicator field associated with the second candidate cell may need to be at least three bits in order to indicate one of 8 unique identifiers.

Accordingly, in some aspects, the L1 measurement report may include varying lengths of local resource indicator fields for different candidate cells. For example, a length of a local resource indicator associated with each beam of a first subset of beams associated with a first candidate cell may be different than a length of a local resource indicator associated with each beam of a second subset of beams associated with a second candidate cell. In such aspects, the L1 measurement report may further indicate a cell identifier associated with each subset of beams. However, in some other aspects, the L1 measurement report may include a same size local resource indicator field for each candidate cell (which may be based at least in part on a maximum number of beams associated with a candidate cell), and the L1 measurement report may pad a local resource indicator field for certain candidate cells (e.g., cells with a number of beams that is less than the maximum number of beams). Put another way, in some aspects, a length of each local resource indicator may be based at least in part on a quantity of beams associated with a candidate cell that includes a highest quantity of beams. In such aspects, the L1 measurement report may omit a cell identifier associated with each subset of beams.

As shown by reference number 625, based at least in part on the measurements reported in the one or more L1 measurement reports described above in connection with reference numbers 615 and 620, the network node 110 may transmit, and the UE 120 may receive, a cell switch command (e.g., the cell switch command described above in connection with reference number 445), a PDCCH order, or a similar communication instructing the UE 120 to execute a cell switch, perform a RACH procedure, and/or take some additional action. For example, in some aspects, the network node 110 may transmit, and the UE 120 may receive, a PDCCH order triggering a RACH procedure associated with a particular candidate cell indicated by the PDCCH order, sometimes referred to herein as a target cell. In that regard, as shown by reference number 630, the UE 120 may perform the RACH procedure associated with the candidate cell that is indicated by the PDCCH order.

Moreover, in some aspects, the UE 120 may identify at least one transmission parameter associated with the RACH procedure based at least in part on the configuration information. For example, if the target cell is already active before the UE 120 receives the cell switch command and/or PDCCH order, the UE 120 may reuse certain communication and/or transmission parameters associated with the target cell, and thus some communication and/or transmission parameters may be omitted from the cell switch command and/or PDCCH order. For example, in some aspects, the cell switch command may omit an indication of a timing advance (TA) parameter and/or a bandwidth part (BWP) parameter, and thus the UE 120 may reuse a TA parameter and/or a BWP parameter associated with the target cell that was in use prior to the UE 120 receiving the cell switch command and/or the PDCCH order. More particularly, if a target cell is an active cell prior to reception of the cell switch command and/or PDCCH order, the UE 120 may reuse BWP information associated with the target cell, and thus the cell switch command and/or PDCCH order may omit an indication of the BWP associated with the target cell. In some other aspects, if a target cell is an active cell prior to reception of the cell switch command and/or PDCCH order and a TA parameter has not expired (e.g., an uplink is still synchronized), the UE 120 may reuse the TA parameter associated with the target cell, and thus the cell switch command and/or PDCCH order may omit an indication of the TA parameter with the target cell. Similarly, in aspects in which a TA parameter for a target cell is indicated in a random access response (RAR) transmitted by the network node 110 to the UE 120, such as in aspects associated with PDCCH-order-based TA measurement with RAR for the target cell, the UE 120 may receive the TA parameter associated with the target cell via the RAR, and thus the cell switch command and/or PDCCH order may omit an indication of the TA parameter with the target cell. Moreover, in aspects in which UE-based TA is implemented, the cell switch command and/or PDCCH order may omit an indication of the TA parameter with the target cell.

In some aspects, for a PDCCH-order-based RACH procedure to a candidate cell, the UE 120 may use a reference signal (e.g., a reference signal associated with an SSB) of a beam indicated in the PDCCH order as a path loss reference signal for a RACH communication transmission power determination. Put another way, in the operations shown in connection with reference number 630, the UE 120 may identify a transmission power level associated with the RACH procedure based at least in part on using, as a path loss reference signal, a reference signal associated with a beam that is indicated by the PDCCH order. In some aspects, the beam that is indicated by the PDCCH order may be configured for one of periodic or semi-persistent L1 measurement reporting (e.g., the UE 120 may expect that the indicated SSB is configured for a periodic or semi-persistent L1-RSRP report).

In some aspects, such as aspects in which the RACH procedure is associated with a contention-based random access (CBRA) procedure without an RAR, the UE 120 may use as a path loss reference signal a reference signal (e.g., an SSB) associated with a beam selected by the UE 120 for the CBRA procedure. Put another way, in the operations shown in connection with reference number 630, the UE 120 may select, for the CBRA procedure, a beam, of multiple beams associated with the candidate cell that is indicated by the PDCCH order, and/or identify a transmission power level associated with the RACH procedure based at least in part on using, as a path loss reference signal, a reference signal associated with the beam selected for the CBRA procedure.

Additionally, or alternatively, the UE 120 may filter and/or measure a reference signal that serves as the path loss reference signal prior to performing the RACH procedure. Put another way, prior to performing the RACH procedure, the UE 120 may measure the reference signal that is to serve as the path loss reference signal and/or filter multiple measurements associated with the reference signal that is to serve as the path loss reference signal. In some aspects, the reference signal (e.g., the SSB) that is to serve as the path loss reference signal may be a reference signal that is configured for at least one of periodic/semi-persistent L1 measurement reporting, or periodic/semi-persistent L3 measurement reporting. Additionally, or alternatively, the reference signal (e.g., the SSB) that is to serve as the path loss reference signal may be associated with a root quasi co-location (QCL) source reference signal in an activated transmission configuration indicator (TCI) state for the candidate cell that is indicated by the PDCCH order. Moreover, the network node 110 may indicate to the UE 120 that the UE 120 is to track the reference signal (e.g., the SSB) that is to serve as the path loss reference signal, such as in downlink synchronization for downlink frame timing or dedicated to path loss reference signal activation. Put another way, in some aspects, the configuration information may indicate that the reference signal is at least one of associated with downlink timing, or dedicated to a path loss reference signal activation procedure. Additionally, or alternatively, the UE 120 may perform a quantity (sometimes referred to as X) of measurements associated with the reference signal prior to performing the RACH procedure, with the quantity (e.g., X) of measurements being indicated by the configuration information and/or being based at least in part on a capability of the UE 120.

In some aspects, for a PDCCH-order-based RACH procedure without RAR, the UE 120 may increase a RACH power boost parameter by a configured power-ramping-up value for every consecutive retransmission for a same candidate cell and beam (e.g., SSB) indicated by the PDCCH order. Put another way, the UE 120 may receive a configuration of a power adjustment value associated with the RACH procedure (e.g., via the configuration information described above in connection with reference number 605). Moreover, in connection with the operations shown in connection with reference number 630, the UE 120 may transmit, using a first transmit power, a RACH communication using a beam associated with the candidate cell that is indicated by the PDCCH order, and the UE 120 may retransmit, using a second transmit power, the RACH communication using the beam associated with the candidate cell that is indicated by the PDCCH order, with the second transmit power being equal to the first transmit power adjusted according to the power adjustment value.

Moreover, in some aspects, any previously increased power boost may be reset to zero by the UE 120 if a different candidate cell and/or beam (e.g., SSB) are indicated by a PDCCH order, and/or if a same candidate cell and/or beam are indicated by a PDCCH order for initial transmission. Put another way, the network node 110 may transmit, and the UE 120 may receive, another PDCCH order triggering another RACH procedure associated with another candidate cell, of the multiple candidate cells, that is indicated by the other PDCCH order, and the UE 120 may thus transmit, using the first transmit power, another RACH communication using a beam associated with the other candidate cell that is indicated by the other PDCCH order.

In some aspects, for a PDCCH-order-based RACH procedure without RAR, the RACH procedure may be completed if no PDCCH order is received triggering a RACH retransmission from the same candidate cell and/or beam (e.g., SSB) with a certain time period from the end of a last RACH transmission. Put another way, in some aspects, the UE 120 may complete the RACH procedure based at least in part on receiving no additional PDCCH orders triggering a retransmission of a RACH communication associated with the RACH procedure within a threshold period of time from an initial transmission of the RACH communication.

In some aspects, for a PDCCH-order-based RACH on a candidate cell, if the candidate cell indicated by the PDCCH order is a current serving cell of the UE 120, an existing power prioritization rule may be reused by the UE 120. Put another way, in connection with the operations shown in connection with reference number 630, the UE 120 may apply a power prioritization rule associated with transmitting a RACH communication associated with the RACH procedure based at least in part on the candidate cell that is indicated by the PDCCH order being a serving cell. Additionally, or alternatively, if the candidate cell indicated by the PDCCH order is not a current serving cell of the UE 120, a communication associated with the RACH procedure may be prioritized if the communication overlaps in time with an uplink transmission on any interrupted serving cell. Put another way, in connection with the operations shown in connection with reference number 630, the UE 120 may prioritize transmission of a RACH communication associated with the RACH procedure over an uplink communication associated with a serving cell that overlaps, in a time domain, with the RACH communication based at least in part on the candidate cell that is indicated by the PDCCH order not being the serving cell.

In some aspects, for a PDCCH-order-based RACH procedure with a response from the network node 110 of a serving cell (e.g., an RAR, which may be a MAC-CE), the response may be transmitted by the network node 110, and received by the UE 120, within a time window. In some aspects, a time offset from an end of a transmission of a RACH communication to a start of the time window may be different for different candidate cells, such as for a purpose of accommodating both intra-DU and inter-DU scenarios. In that regard, in some aspects, the network node 110 may transmit, and the UE 120 may receive, an indication of a time offset associated with the candidate cell that is indicated by the PDCCH order, with the time offset corresponding to a period of time between when a RACH communication associated with the RACH procedure is transmitted by the UE and a start of a time window when a RAR is to be received by the UE 120. Additionally, or alternatively, the network node 110 may transmit, and the UE 120 may receive, an indication of multiple time offsets, with each time offset being associated with a respective candidate cell. In such aspects, in connection with the operations shown by reference number 630, the UE 120 may select the time offset associated with the candidate cell that is indicated by the PDCCH order based at least in part on receiving the PDCCH order. Moreover, in aspects in which the UE 120 does not receive an RAR within the time window, the UE 120 may retransmit the RACH communication in a next valid RACH occasion for the indicated beam (e.g., SSB) and/or candidate cell, with a transmit power of the RACH communication being determined based at least in part on an existing power determination rule. Put another way, in some aspects, the UE 120 may retransmit the RACH communication based at least in part on not receiving the RAR within the time window.

Based at least in part on the UE 120 reporting L1 measurements using differential reporting and/or identifying at least one communication parameter omitted from a PDCCH order, the UE 120 and/or the network node 110 may conserve computing, power, network, and/or communication resources that may have otherwise been consumed using traditional LTM procedures. For example, based at least in part on the UE 120 reporting L1 measurements using differential reporting and/or identifying at least one communication parameter omitted from a PDCCH order, the UE 120 and the network node 110 may communicate with reduced signaling overhead, which may conserve computing, power, network, and/or communication resources that may have otherwise been consumed to trigger an LTM cell switch.

As indicated above, FIG. 6 is provided as an example. Other examples may differ from what is described with respect to FIG. 6.

Figure 7:
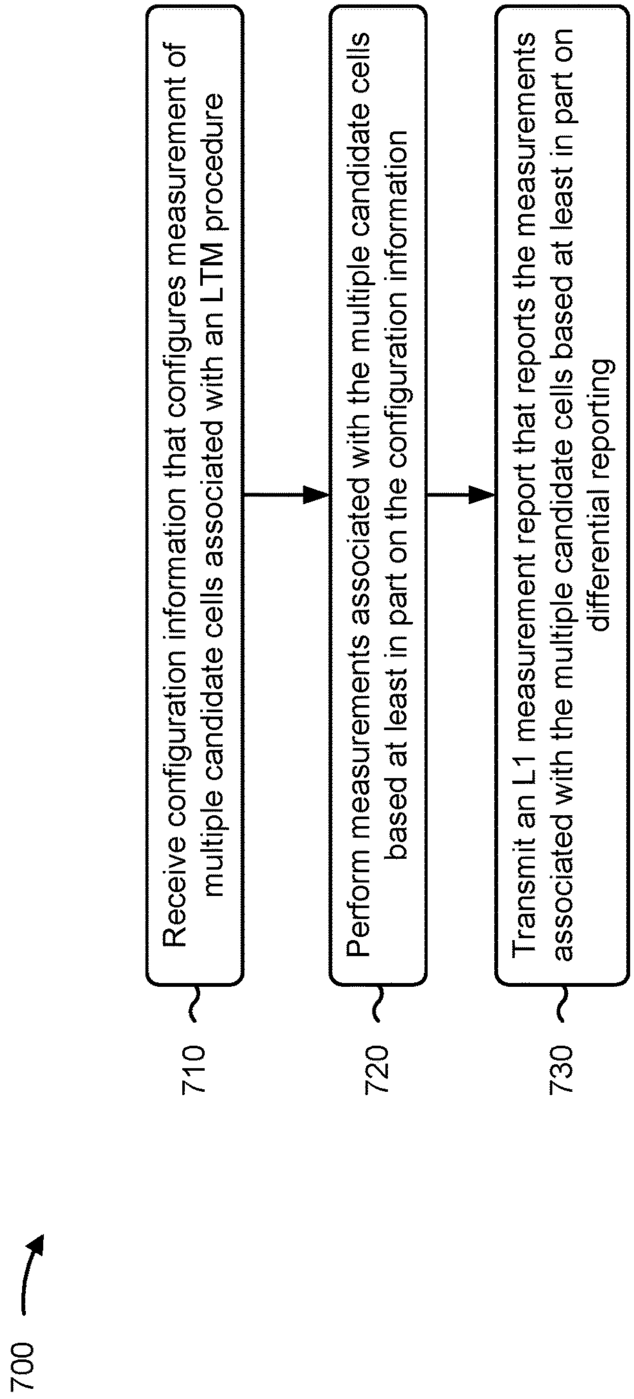
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120) performs operations associated with LTM differential reporting.

As shown in FIG. 7, in some aspects, process 700 may include receiving configuration information that configures measurement of multiple candidate cells associated with an LTM procedure (block 710). For example, the UE (e.g., using reception component 1102 and/or communication manager 1106, depicted in FIG. 11) may receive configuration information that configures measurement of multiple candidate cells associated with an LTM procedure, as described above.

As further shown in FIG. 7, in some aspects, process 700 may include performing measurements associated with the multiple candidate cells based at least in part on the configuration information (block 720). For example, the UE (e.g., using communication manager 1106, depicted in FIG. 11) may perform measurements associated with the multiple candidate cells based at least in part on the configuration information, as described above.

As further shown in FIG. 7, in some aspects, process 700 may include transmitting an L1 measurement report that reports the measurements associated with the multiple candidate cells based at least in part on differential reporting (block 730). For example, the UE (e.g., using transmission component 1104 and/or communication manager 1106, depicted in FIG. 11) may transmit an L1 measurement report that reports the measurements associated with the multiple candidate cells based at least in part on differential reporting, as described above.

Process 700 may include additional aspects, such as any single aspect or any combination of aspects described below and/or in connection with one or more other processes described elsewhere herein.

In a first aspect, the configuration information further configures measurement of multiple beams associated with the LTM procedure, and each candidate cell, of the multiple candidate cells, is associated with a respective subset of beams, of the multiple beams.

In a second aspect, alone or in combination with the first aspect, the L1 measurement report indicates a reference value of a measurement associated with a strongest-measured beam, of the multiple beams, and the L1 measurement report indicates differential values, with respect to the reference value, of measurements associated with each other beam, of the multiple beams, that is not the strongest-measured beam.

In a third aspect, alone or in combination with one or more of the first and second aspects, the L1 measurement report indicates the reference value first in a list of measurements, and the L1 measurement report indicates the differential values second in the list of measurements by listing the differential values in descending order of size.

In a fourth aspect, alone or in combination with one or more of the first through third aspects, the L1 measurement report indicates, for each beam, of the multiple beams, a respective global resource indicator.

In a fifth aspect, alone or in combination with one or more of the first through fourth aspects, the L1 measurement report indicates, for each beam, of the multiple beams, a respective cell identifier and a respective local resource indicator.

In a sixth aspect, alone or in combination with one or more of the first through fifth aspects, the L1 measurement report indicates a list of multiple groups of beam measurements, each group of beam measurements, of the multiple groups of beam measurements, is associated with a respective candidate cell, of the multiple candidate cells, and, for each group of beam measurements, the L1 measurement report indicates a subset of the differential values, which are associated with the respective candidate cell, in descending order of size.

In a seventh aspect, alone or in combination with one or more of the first through sixth aspects, the L1 measurement report indicates a group of beam measurements that includes the reference value first in the list of multiple groups of beam measurements.

In an eighth aspect, alone or in combination with one or more of the first through seventh aspects, the L1 measurement report indicates, for each beam, of the multiple beams, a respective global resource indicator.

In a ninth aspect, alone or in combination with one or more of the first through eighth aspects, the L1 measurement report indicates, for each group of beam measurements, of the multiple groups of beam measurements, a respective cell identifier, and the L1 measurement report indicates, for each beam, of the multiple beams, a respective local resource indicator.

In a tenth aspect, alone or in combination with one or more of the first through ninth aspects, the L1 measurement report indicates a beam measurement that is associated with the reference value.

In an eleventh aspect, alone or in combination with one or more of the first through tenth aspects, the L1 measurement report indicates a group of beam measurements associated with a serving cell, and the L1 measurement report indicates the group of beam measurements associated with the serving cell first in the list of multiple groups of beam measurements.

In a twelfth aspect, alone or in combination with one or more of the first through eleventh aspects, the L1 measurement report omits a cell identifier associated with the group of beam measurements associated with the serving cell.

In a thirteenth aspect, alone or in combination with one or more of the first through twelfth aspects, the L1 measurement report indicates another reference value of a measurement associated with a strongest-measured beam of the serving cell, and the L1 measurement report indicates other differential values, with respect to the other reference value, of measurements associated with each other beam, of beams associated with the serving cell, that is not the strongest-measured beam of the serving cell.

In a fourteenth aspect, alone or in combination with one or more of the first through thirteenth aspects, process 700 includes transmitting another L1 measurement report that reports measurements associated with multiple beams of a serving cell based at least in part on differential reporting.

In a fifteenth aspect, alone or in combination with one or more of the first through fourteenth aspects, the L1 measurement report indicates measurements associated with multiple beams of a serving cell based at least in part on differential reporting.

In a sixteenth aspect, alone or in combination with one or more of the first through fifteenth aspects, the L1 measurement report indicates, for each candidate cell a reference value of a measurement associated with a strongest-measured beam, of the respective subset of beams, and differential values, with respect to the reference value, of measurements associated with each other beam, of the respective subset of beams, that is not the strongest-measured beam.

In a seventeenth aspect, alone or in combination with one or more of the first through sixteenth aspects, the L1 measurement report indicates: a reference value of a measurement associated with a strongest-measured beam, of the multiple beams; for each candidate cell, of the multiple candidate cells, that does not include the strongest-measured beam, a differential value, with respect to the reference value, of a measurement associated with a strongest-measured beam, of the respective subset of beams; and for each candidate cell, of the multiple candidate cells, differential values, with respect to a value of the measurement associated with the strongest-measured beam of the respective candidate cell, of measurements associated with each other beam, of the respective subset of beams, that is not the strongest-measured beam.

In an eighteenth aspect, alone or in combination with one or more of the first through seventeenth aspects, the L1 measurement report indicates that a measurement is associated with a strongest-measured beam, of the multiple beams, based at least in part on including the measurement associated with the strongest-measured beam at a specific location within the L1 measurement report.

In a nineteenth aspect, alone or in combination with one or more of the first through eighteenth aspects, the specific location is associated with a first-listed measurement in the L1 measurement report.

In a twentieth aspect, alone or in combination with one or more of the first through nineteenth aspects, the L1 measurement report indicates measurements associated with the multiple beams in a specific order based at least in part on respective beam identifiers associated with the multiple beams.

In a twenty-first aspect, alone or in combination with one or more of the first through twentieth aspects, the L1 measurement report indicates a location of a measurement associated with a strongest-measured beam, of the multiple beams.

In a twenty-second aspect, alone or in combination with one or more of the first through twenty-first aspects, each beam, of the multiple beams, is associated with a local resource indicator, and a length of a local resource indicator associated with each beam, of a first subset of beams associated with a first candidate cell, is different than a length of a local resource indicator associated with each beam of a second subset of beams associated with a second candidate cell.

In a twenty-third aspect, alone or in combination with one or more of the first through twenty-second aspects, each beam, of the multiple beams, is associated with a local resource indicator, and a length of each local resource indicator is based at least in part on a quantity of beams associated with a candidate cell, of the multiple candidate cells, that includes a highest quantity of beams.

In a twenty-fourth aspect, alone or in combination with one or more of the first through twenty-third aspects, process 700 includes receiving a PDCCH order triggering a RACH procedure associated with a candidate cell, of the multiple candidate cells, that is indicated by the PDCCH order, and performing the RACH procedure associated with the candidate cell that is indicated by the PDCCH order.

In a twenty-fifth aspect, alone or in combination with one or more of the first through twenty-fourth aspects, process 700 includes identifying a transmission power level associated with the RACH procedure based at least in part on using, as a path loss reference signal, a reference signal associated with a beam that is indicated by the PDCCH order.

In a twenty-sixth aspect, alone or in combination with one or more of the first through twenty-fifth aspects, the beam that is indicated by the PDCCH order is configured for one of periodic or semi-persistent L1 measurement reporting.

In a twenty-seventh aspect, alone or in combination with one or more of the first through twenty-sixth aspects, the RACH procedure is associated with a CBRA procedure, and process 700 includes selecting, for the CBRA procedure, a beam, of multiple beams associated with the candidate cell that is indicated by the PDCCH order, and identifying a transmission power level associated with the RACH procedure based at least in part on using, as a path loss reference signal, a reference signal associated with the beam selected for the CBRA procedure.

In a twenty-eighth aspect, alone or in combination with one or more of the first through twenty-seventh aspects, process 700 includes identifying a transmission power level associated with the RACH procedure based at least in part on using, as a path loss reference signal, a reference signal associated with a beam associated with the candidate cell that is indicated by the PDCCH order, and prior to performing the RACH procedure, at least one of measuring the reference signal, or filtering multiple measurements associated with the reference signal.

In a twenty-ninth aspect, alone or in combination with one or more of the first through twenty-eighth aspects, the reference signal is configured for at least one of: one of periodic or semi-persistent L1 measurement reporting, or one of periodic or semi-persistent layer 3 measurement reporting.

In a thirtieth aspect, alone or in combination with one or more of the first through twenty-ninth aspects, the reference signal is associated with a root quasi co-location source reference signal in an activated transmission configuration indicator state for the candidate cell that is indicated by the PDCCH order.

In a thirty-first aspect, alone or in combination with one or more of the first through thirtieth aspects, the configuration information indicates that the reference signal is at least one of associated with downlink timing, or dedicated to a path loss reference signal activation procedure.

In a thirty-second aspect, alone or in combination with one or more of the first through thirty-first aspects, process 700 includes performing a quantity of measurements associated with the reference signal prior to performing the RACH procedure, wherein the quantity of measurements is one of indicated by the configuration information or based at least in part on a capability of the UE.

In a thirty-third aspect, alone or in combination with one or more of the first through thirty-second aspects, process 700 includes receiving a configuration of a power adjustment value associated with the RACH procedure, transmitting, using a first transmit power, a RACH communication using a beam associated with the candidate cell that is indicated by the PDCCH order, and retransmitting, using a second transmit power, the RACH communication using the beam associated with the candidate cell that is indicated by the PDCCH order, wherein the second transmit power is associated with the first transmit power adjusted according to the power adjustment value.

In a thirty-fourth aspect, alone or in combination with one or more of the first through thirty-third aspects, process 700 includes receiving another PDCCH order triggering another RACH procedure associated with another candidate cell, of the multiple candidate cells, that is indicated by the other PDCCH order, and transmitting, using the first transmit power, another RACH communication using a beam associated with the other candidate cell that is indicated by the other PDCCH order.

In a thirty-fifth aspect, alone or in combination with one or more of the first through thirty-fourth aspects, process 700 includes completing the RACH procedure based at least in part on receiving no additional PDCCH orders triggering a retransmission of a RACH communication associated with the RACH procedure within a threshold period of time from an initial transmission of the RACH communication.

In a thirty-sixth aspect, alone or in combination with one or more of the first through thirty-fifth aspects, process 700 includes applying a power prioritization rule associated with transmitting a RACH communication associated with the RACH procedure based at least in part on the candidate cell that is indicated by the PDCCH order being a serving cell.

In a thirty-seventh aspect, alone or in combination with one or more of the first through thirty-sixth aspects, process 700 includes prioritizing transmission of a RACH communication associated with the RACH procedure over an uplink communication associated with a serving cell that overlaps, in a time domain, with the RACH communication based at least in part on the candidate cell that is indicated by the PDCCH order not being the serving cell.

In a thirty-eighth aspect, alone or in combination with one or more of the first through thirty-seventh aspects, process 700 includes receiving an indication of a time offset associated with the candidate cell that is indicated by the PDCCH order, wherein the time offset corresponds to a period of time between when a RACH communication associated with the RACH procedure is transmitted by the UE and a start of a time window when an RAR is to be received by the UE.

In a thirty-ninth aspect, alone or in combination with one or more of the first through thirty-eighth aspects, process 700 includes receiving an indication of multiple time offsets, wherein each time offset, of the multiple time offsets, is associated with a respective candidate cell, of the multiple candidate cells, and selecting the time offset associated with the candidate cell that is indicated by the PDCCH order based at least in part on receiving the PDCCH order.

In a fortieth aspect, alone or in combination with one or more of the first through thirty-ninth aspects, process 700 includes retransmitting the RACH communication based at least in part on not receiving the RAR within the time window.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
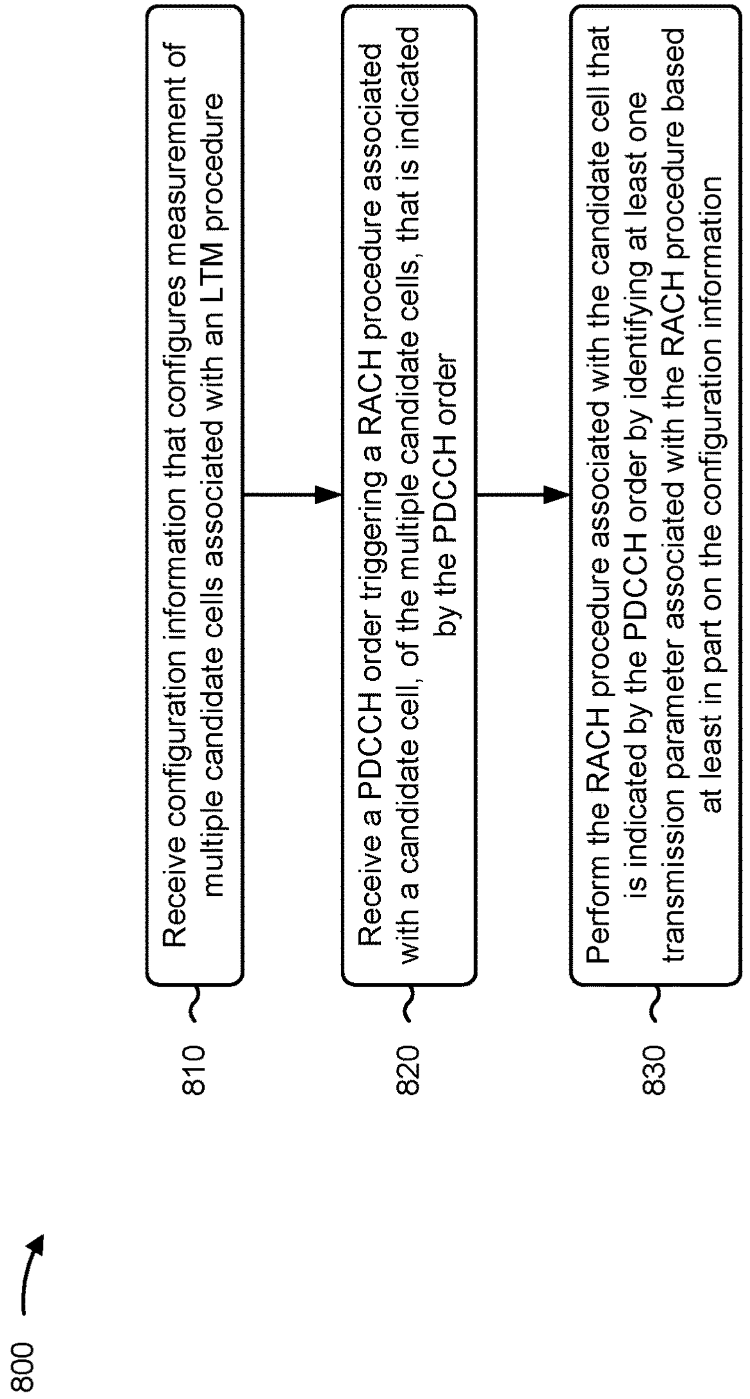
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with LTM transmission parameter configuration.

As shown in FIG. 8, in some aspects, process 800 may include receiving configuration information that configures measurement of multiple candidate cells associated with an LTM procedure (block 810). For example, the UE (e.g., using reception component 1102 and/or communication manager 1106, depicted in FIG. 11) may receive configuration information that configures measurement of multiple candidate cells associated with an LTM procedure, as described above.

As further shown in FIG. 8, in some aspects, process 800 may include receiving a PDCCH order triggering a RACH procedure associated with a candidate cell, of the multiple candidate cells, that is indicated by the PDCCH order (block 820). For example, the UE (e.g., using reception component 1102 and/or communication manager 1106, depicted in FIG. 11) may receive a physical downlink control channel (PDCCH) order triggering a RACH procedure associated with a candidate cell, of the multiple candidate cells, that is indicated by the PDCCH order, as described above.

As further shown in FIG. 8, in some aspects, process 800 may include performing the RACH procedure associated with the candidate cell that is indicated by the PDCCH order by identifying at least one transmission parameter associated with the RACH procedure based at least in part on the configuration information (block 830). For example, the UE (e.g., using communication manager 1106, depicted in FIG. 11) may perform the RACH procedure associated with the candidate cell that is indicated by the PDCCH order by identifying at least one transmission parameter associated with the RACH procedure based at least in part on the configuration information, as described above.

Process 800 may include additional aspects, such as any single aspect or any combination of aspects described below and/or in connection with one or more other processes described elsewhere herein.

In a first aspect, identifying the at least one transmission parameter associated with the RACH procedure comprises identifying a transmission power level associated with the RACH procedure based at least in part on using, as a path loss reference signal, a reference signal associated with a beam that is indicated by the PDCCH order.

In a second aspect, alone or in combination with the first aspect, the beam that is indicated by the PDCCH order is configured for one of periodic or semi-persistent L1 measurement reporting.

In a third aspect, alone or in combination with one or more of the first and second aspects, the RACH procedure is associated with a CBRA procedure, and process 800 includes selecting, for the CBRA procedure, a beam, of multiple beams associated with the candidate cell that is indicated by the PDCCH order, wherein identifying the at least one transmission parameter associated with the RACH procedure comprises identifying a transmission power level associated with the RACH procedure based at least in part on using, as a path loss reference signal, a reference signal associated with the beam selected for the CBRA procedure.

In a fourth aspect, alone or in combination with one or more of the first through third aspects, identifying the at least one transmission parameter associated with the RACH procedure comprises identifying a transmission power level associated with the RACH procedure based at least in part on using, as a path loss reference signal, a reference signal associated with a beam associated with the candidate cell that is indicated by the PDCCH order, and process 800 includes, prior to performing the RACH procedure, at least one of measuring the reference signal, or filtering multiple measurements associated with the reference signal.

In a fifth aspect, alone or in combination with one or more of the first through fourth aspects, the reference signal is configured for at least one of: one of periodic or semi-persistent L1 measurement reporting, or one of periodic or semi-persistent layer 3 measurement reporting.

In a sixth aspect, alone or in combination with one or more of the first through fifth aspects, the reference signal is associated with a root quasi co-location source reference signal in an activated transmission configuration indicator state for the candidate cell that is indicated by the PDCCH order.

In a seventh aspect, alone or in combination with one or more of the first through sixth aspects, the configuration information indicates that the reference signal is at least one of associated with downlink timing, or dedicated to a path loss reference signal activation procedure.

In an eighth aspect, alone or in combination with one or more of the first through seventh aspects, process 800 includes performing a quantity of measurements associated with the reference signal prior to performing the RACH procedure, wherein the quantity of measurements is one of indicated by the configuration information or based at least in part on a capability of the UE.

In a ninth aspect, alone or in combination with one or more of the first through eighth aspects, process 800 includes receiving a configuration of a power adjustment value associated with the RACH procedure, wherein identifying the at least one transmission parameter associated with the RACH procedure comprises transmitting, using a first transmit power, a RACH communication using a beam associated with the candidate cell that is indicated by the PDCCH order, and retransmitting, using a second transmit power, the RACH communication using the beam associated with the candidate cell that is indicated by the PDCCH order, wherein the second transmit power is associated with the first transmit power adjusted according to the power adjustment value.

In a tenth aspect, alone or in combination with one or more of the first through ninth aspects, process 800 includes receiving another PDCCH order triggering another RACH procedure associated with another candidate cell, of the multiple candidate cells, that is indicated by the other PDCCH order, and transmitting, using the first transmit power, another RACH communication using a beam associated with the other candidate cell that is indicated by the other PDCCH order.

In an eleventh aspect, alone or in combination with one or more of the first through tenth aspects, process 800 includes completing the RACH procedure based at least in part on receiving no additional PDCCH orders triggering a retransmission of a RACH communication associated with the RACH procedure within a threshold period of time from an initial transmission of the RACH communication.

In a twelfth aspect, alone or in combination with one or more of the first through eleventh aspects, identifying the at least one transmission parameter associated with the RACH procedure comprises applying a power prioritization rule associated with transmitting a RACH communication associated with the RACH procedure based at least in part on the candidate cell that is indicated by the PDCCH order being a serving cell.

In a thirteenth aspect, alone or in combination with one or more of the first through twelfth aspects, identifying the at least one transmission parameter associated with the RACH procedure comprises prioritizing transmission of a RACH communication associated with the RACH procedure over an uplink communication associated with a serving cell that overlaps, in a time domain, with the RACH communication based at least in part on the candidate cell that is indicated by the PDCCH order not being the serving cell.

In a fourteenth aspect, alone or in combination with one or more of the first through thirteenth aspects, process 800 includes receiving an indication of a time offset associated with the candidate cell that is indicated by the PDCCH order, wherein the time offset corresponds to a period of time between when a RACH communication associated with the RACH procedure is transmitted by the UE and a start of a time window when an RAR is to be received by the UE.

In a fifteenth aspect, alone or in combination with one or more of the first through fourteenth aspects, process 800 includes receiving an indication of multiple time offsets, wherein each time offset, of the multiple time offsets, is associated with a respective candidate cell, of the multiple candidate cells, wherein identifying the at least one transmission parameter associated with the RACH procedure comprises selecting the time offset associated with the candidate cell that is indicated by the PDCCH order based at least in part on receiving the PDCCH order.

In a sixteenth aspect, alone or in combination with one or more of the first through fifteenth aspects, process 800 includes retransmitting the RACH communication based at least in part on not receiving the RAR within the time window.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
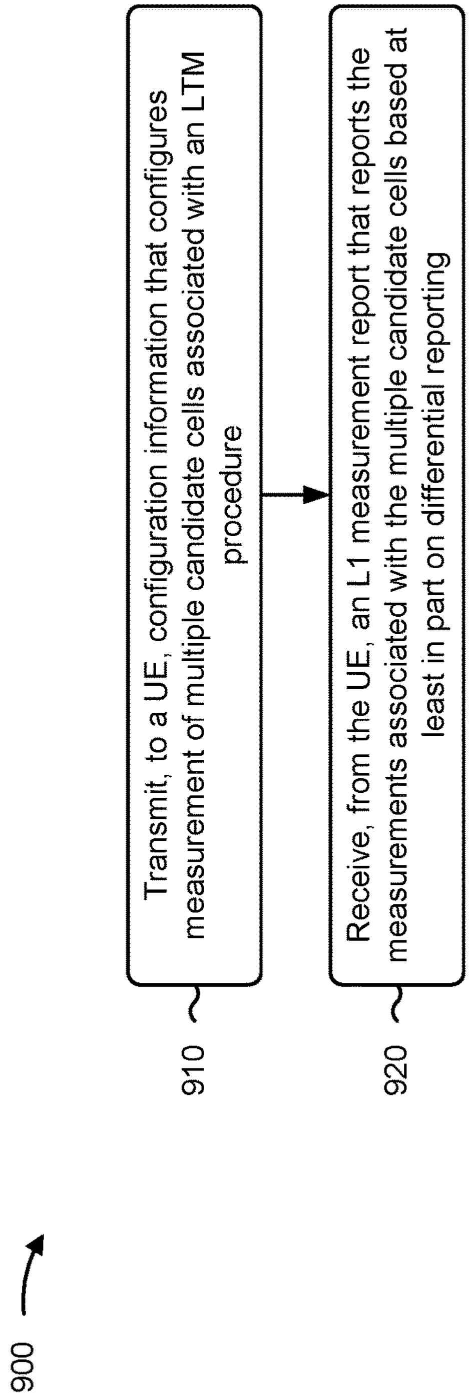
FIG. 9 is a diagram illustrating an example process performed, for example, by a network node, in accordance with the present disclosure.

FIG. 9 is a diagram illustrating an example process 900 performed, for example, by a network node, in accordance with the present disclosure. Example process 900 is an example where the network node (e.g., network node 110) performs operations associated with LTM mobility differential reporting.

As shown in FIG. 9, in some aspects, process 900 may include transmitting, to a UE, configuration information that configures measurement of multiple candidate cells associated with an LTM procedure (block 910). For example, the network node (e.g., using transmission component 1204 and/or communication manager 1206, depicted in FIG. 12) may transmit, to a UE, configuration information that configures measurement of multiple candidate cells associated with an LTM procedure, as described above.

As further shown in FIG. 9, in some aspects, process 900 may include receiving, from the UE, an L1 measurement report that reports the measurements associated with the multiple candidate cells based at least in part on differential reporting (block 920). For example, the network node (e.g., using reception component 1202 and/or communication manager 1206, depicted in FIG. 12) may receive, from the UE, an L1 measurement report that reports the measurements associated with the multiple candidate cells based at least in part on differential reporting, as described above.

Process 900 may include additional aspects, such as any single aspect or any combination of aspects described below and/or in connection with one or more other processes described elsewhere herein.

In a first aspect, the configuration information further configures measurement of multiple beams associated with the LTM procedure, and each candidate cell, of the multiple candidate cells, is associated with a respective subset of beams, of the multiple beams.

In a second aspect, alone or in combination with the first aspect, the L1 measurement report indicates a reference value of a measurement associated with a strongest-measured beam, of the multiple beams, and the L1 measurement report indicates differential values, with respect to the reference value, of measurements associated with each other beam, of the multiple beams, that is not the strongest-measured beam.

In a third aspect, alone or in combination with one or more of the first and second aspects, the L1 measurement report indicates the reference value first in a list of measurements, and the L1 measurement report indicates the differential values second in the list of measurements by listing the differential values in descending order of size.

In a fourth aspect, alone or in combination with one or more of the first through third aspects, the L1 measurement report indicates, for each beam, of the multiple beams, a respective global resource indicator.

In a fifth aspect, alone or in combination with one or more of the first through fourth aspects, the L1 measurement report indicates, for each beam, of the multiple beams, a respective cell identifier and a respective local resource indicator.

In a sixth aspect, alone or in combination with one or more of the first through fifth aspects, the L1 measurement report indicates a list of multiple groups of beam measurements, each group of beam measurements, of the multiple groups of beam measurements, is associated with a respective candidate cell, of the multiple candidate cells, and, for each group of beam measurements, the L1 measurement report indicates a subset of the differential values, which are associated with the respective candidate cell, in descending order of size.

In a seventh aspect, alone or in combination with one or more of the first through sixth aspects, the L1 measurement report indicates a group of beam measurements that includes the reference value first in the list of multiple groups of beam measurements.

In an eighth aspect, alone or in combination with one or more of the first through seventh aspects, the L1 measurement report indicates, for each beam, of the multiple beams, a respective global resource indicator.

In a ninth aspect, alone or in combination with one or more of the first through eighth aspects, the L1 measurement report indicates, for each group of beam measurements, of the multiple groups of beam measurements, a respective cell identifier, and the L1 measurement report indicates, for each beam, of the multiple beams, a respective local resource indicator.

In a tenth aspect, alone or in combination with one or more of the first through ninth aspects, the L1 measurement report indicates a beam measurement that is associated with the reference value.

In an eleventh aspect, alone or in combination with one or more of the first through tenth aspects, the L1 measurement report indicates a group of beam measurements associated with a serving cell, and the L1 measurement report indicates the group of beam measurements associated with the serving cell first in the list of multiple groups of beam measurements.

In a twelfth aspect, alone or in combination with one or more of the first through eleventh aspects, the L1 measurement report omits a cell identifier associated with the group of beam measurements associated with the serving cell.

In a thirteenth aspect, alone or in combination with one or more of the first through twelfth aspects, the L1 measurement report indicates another reference value of a measurement associated with a strongest-measured beam of the serving cell, and the L1 measurement report indicates other differential values, with respect to the other reference value, of measurements associated with each other beam, of beams associated with the serving cell, that is not the strongest-measured beam of the serving cell.

In a fourteenth aspect, alone or in combination with one or more of the first through thirteenth aspects, process 900 includes receiving, from the UE, another L1 measurement report that reports measurements associated with multiple beams of a serving cell based at least in part on differential reporting.

In a fifteenth aspect, alone or in combination with one or more of the first through fourteenth aspects, the L1 measurement report indicates measurements associated with multiple beams of a serving cell based at least in part on differential reporting.

In a sixteenth aspect, alone or in combination with one or more of the first through fifteenth aspects, the L1 measurement report indicates, for each candidate cell a reference value of a measurement associated with a strongest-measured beam, of the respective subset of beams, and differential values, with respect to the reference value, of measurements associated with each other beam, of the respective subset of beams, that is not the strongest-measured beam.

In a seventeenth aspect, alone or in combination with one or more of the first through sixteenth aspects, the L1 measurement report indicates: a reference value of a measurement associated with a strongest-measured beam, of the multiple beams; for each candidate cell, of the multiple candidate cells, that does not include the strongest-measured beam, a differential value, with respect to the reference value, of a measurement associated with a strongest-measured beam, of the respective subset of beams; and for each candidate cell, of the multiple candidate cells, differential values, with respect to a value of the measurement associated with the strongest-measured beam of the respective candidate cell, of measurements associated with each other beam, of the respective subset of beams, that is not the strongest-measured beam.

In an eighteenth aspect, alone or in combination with one or more of the first through seventeenth aspects, the L1 measurement report indicates that a measurement is associated with a strongest-measured beam, of the multiple beams, based at least in part on including the measurement associated with the strongest-measured beam at a specific location within the L1 measurement report.

In a nineteenth aspect, alone or in combination with one or more of the first through eighteenth aspects, the specific location is associated with a first-listed measurement in the L1 measurement report.

In a twentieth aspect, alone or in combination with one or more of the first through nineteenth aspects, the L1 measurement report indicates measurements associated with the multiple beams in a specific order based at least in part on respective beam identifiers associated with the multiple beams.

In a twenty-first aspect, alone or in combination with one or more of the first through twentieth aspects, the L1 measurement report indicates a location of a measurement associated with a strongest-measured beam, of the multiple beams.

In a twenty-second aspect, alone or in combination with one or more of the first through twenty-first aspects, each beam, of the multiple beams, is associated with a local resource indicator, and a length of a local resource indicator associated with each beam, of a first subset of beams associated with a first candidate cell, is different than a length of a local resource indicator associated with each beam of a second subset of beams associated with a second candidate cell.

In a twenty-third aspect, alone or in combination with one or more of the first through twenty-second aspects, each beam, of the multiple beams, is associated with a local resource indicator, and a length of each local resource indicator is based at least in part on a quantity of beams associated with a candidate cell, of the multiple candidate cells, that includes a highest quantity of beams.

In a twenty-fourth aspect, alone or in combination with one or more of the first through twenty-third aspects, process 900 includes transmitting, to the UE, a PDCCH order triggering a RACH procedure associated with a candidate cell, of the multiple candidate cells, that is indicated by the PDCCH order.

In a twenty-fifth aspect, alone or in combination with one or more of the first through twenty-fourth aspects, a transmission power level associated with the RACH procedure is based at least in part on using, as a path loss reference signal, a reference signal associated with a beam that is indicated by the PDCCH order.

In a twenty-sixth aspect, alone or in combination with one or more of the first through twenty-fifth aspects, the beam that is indicated by the PDCCH order is configured for one of periodic or semi-persistent L1 measurement reporting.

In a twenty-seventh aspect, alone or in combination with one or more of the first through twenty-sixth aspects, the RACH procedure is associated with a CBRA procedure, a beam, of multiple beams associated with the candidate cell that is indicated by the PDCCH order is used for the CBRA procedure, and a transmission power level associated with the RACH procedure is based at least in part on using, as a path loss reference signal, a reference signal associated with the beam selected for the CBRA procedure.

In a twenty-eighth aspect, alone or in combination with one or more of the first through twenty-seventh aspects, a transmission power level associated with the RACH procedure is based at least in part on using, as a path loss reference signal, a reference signal associated with a beam associated with the candidate cell that is indicated by the PDCCH order, and, prior to the RACH procedure, the reference signal is measured or multiple measurements associated with the reference signal are filtered.

In a twenty-ninth aspect, alone or in combination with one or more of the first through twenty-eighth aspects, the reference signal is configured for at least one of: one of periodic or semi-persistent L1 measurement reporting, or one of periodic or semi-persistent layer 3 measurement reporting.

In a thirtieth aspect, alone or in combination with one or more of the first through twenty-ninth aspects, the reference signal is associated with a root quasi co-location source reference signal in an activated transmission configuration indicator state for the candidate cell that is indicated by the PDCCH order.

In a thirty-first aspect, alone or in combination with one or more of the first through thirtieth aspects, the configuration information indicates that the reference signal is at least one of associated with downlink timing, or dedicated to a path loss reference signal activation procedure.

In a thirty-second aspect, alone or in combination with one or more of the first through thirty-first aspects, a quantity of measurements associated with the reference signal are performed prior to performing the RACH procedure, and the quantity of measurements is one of indicated by the configuration information or based at least in part on a capability of the UE.

In a thirty-third aspect, alone or in combination with one or more of the first through thirty-second aspects, process 900 includes transmitting, to the UE, a configuration of a power adjustment value associated with the RACH procedure, wherein a RACH communication is transmitted, based at least in part on a first transmit power, using a beam associated with the candidate cell that is indicated by the PDCCH order, wherein the RACH communication is retransmitted, based at least in part on a second transmit power, using the beam associated with the candidate cell that is indicated by the PDCCH order, and wherein the second transmit power is associated with the first transmit power adjusted according to the power adjustment value.

In a thirty-fourth aspect, alone or in combination with one or more of the first through thirty-third aspects, process 900 includes transmitting, to the UE, another PDCCH order triggering another RACH procedure associated with another candidate cell, of the multiple candidate cells, that is indicated by the other PDCCH order, and receiving, from the UE and based at least in part on the first transmit power, another RACH communication using a beam associated with the other candidate cell that is indicated by the other PDCCH order.

In a thirty-fifth aspect, alone or in combination with one or more of the first through thirty-fourth aspects, the RACH procedure is completed based at least in part on transmitting no additional PDCCH orders triggering a retransmission of a RACH communication associated with the RACH procedure within a threshold period of time from an initial transmission of the RACH communication.

In a thirty-sixth aspect, alone or in combination with one or more of the first through thirty-fifth aspects, a power prioritization rule associated with transmitting a RACH communication associated with the RACH procedure is applied based at least in part on the candidate cell that is indicated by the PDCCH order being a serving cell.

In a thirty-seventh aspect, alone or in combination with one or more of the first through thirty-sixth aspects, a transmission of a RACH communication associated with the RACH procedure is prioritized over an uplink communication associated with a serving cell that overlaps, in a time domain, with the RACH communication based at least in part on the candidate cell that is indicated by the PDCCH order not being the serving cell.

In a thirty-eighth aspect, alone or in combination with one or more of the first through thirty-seventh aspects, process 900 includes transmitting, to the UE, an indication of a time offset associated with the candidate cell that is indicated by the PDCCH order, wherein the time offset corresponds to a period of time between when a RACH communication associated with the RACH procedure is transmitted by the UE and a start of a time window when RAR is to be received by the UE.

In a thirty-ninth aspect, alone or in combination with one or more of the first through thirty-eighth aspects, process 900 includes transmitting, to the UE, an indication of multiple time offsets, wherein each time offset, of the multiple time offsets, is associated with a respective candidate cell, of the multiple candidate cells.

In a fortieth aspect, alone or in combination with one or more of the first through thirty-ninth aspects, process 900 includes receiving, from the UE, a retransmission of the RACH communication based at least in part on not transmitting the RAR within the time window.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
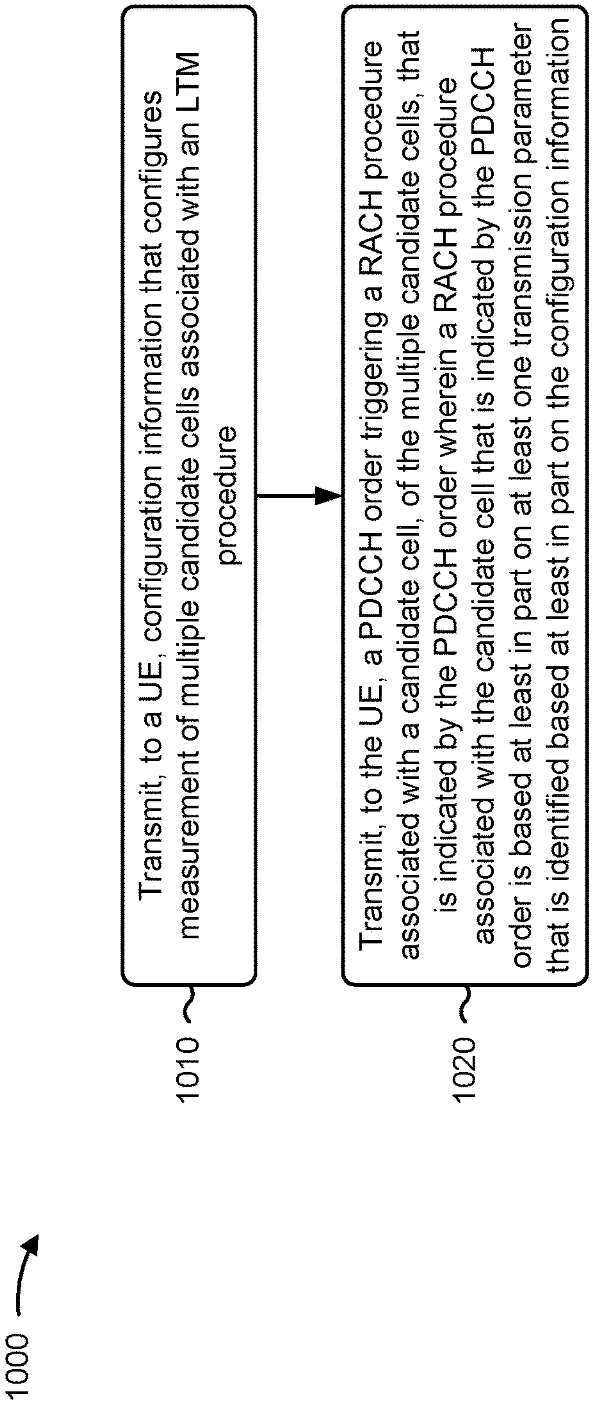
FIG. 10 is a diagram illustrating an example process performed, for example, by a network node, in accordance with the present disclosure.

FIG. 10 is a diagram illustrating an example process 1000 performed, for example, by a network node, in accordance with the present disclosure. Example process 1000 is an example where the network node (e.g., network node 110) performs operations associated with LTM transmission parameter configuration.

As shown in FIG. 10, in some aspects, process 1000 may include transmitting, to a UE, configuration information that configures measurement of multiple candidate cells associated with an LTM procedure (block 1010). For example, the network node (e.g., using transmission component 1204 and/or communication manager 1206, depicted in FIG. 12) may transmit, to a UE, configuration information that configures measurement of multiple candidate cells associated with an LTM procedure, as described above.

As further shown in FIG. 10, in some aspects, process 1000 may include transmitting, to the UE, a PDCCH order triggering a RACH procedure associated with a candidate cell, of the multiple candidate cells, that is indicated by the PDCCH order, wherein a RACH procedure associated with the candidate cell that is indicated by the PDCCH order is based at least in part on at least one transmission parameter that is identified based at least in part on the configuration information (block 1020). For example, the network node (e.g., using transmission component 1204 and/or communication manager 1206, depicted in FIG. 12) may transmit, to the UE, a PDCCH order triggering a RACH procedure associated with a candidate cell, of the multiple candidate cells, that is indicated by the PDCCH order, wherein a RACH procedure associated with the candidate cell that is indicated by the PDCCH order is based at least in part on at least one transmission parameter that is identified based at least in part on the configuration information, as described above. In some aspects, a RACH procedure associated with the candidate cell that is indicated by the PDCCH order is based at least in part on at least one transmission parameter that is identified based at least in part on the configuration information.

Process 1000 may include additional aspects, such as any single aspect or any combination of aspects described below and/or in connection with one or more other processes described elsewhere herein.

In a first aspect, the at least one transmission parameter comprises a transmission power level associated with the RACH procedure that is identified based at least in part on using, as a path loss reference signal, a reference signal associated with a beam that is indicated by the PDCCH order.

In a second aspect, alone or in combination with the first aspect, the beam that is indicated by the PDCCH order is configured for one of periodic or semi-persistent L1 measurement reporting.

In a third aspect, alone or in combination with one or more of the first and second aspects, the RACH procedure is associated with a CBRA procedure, and a beam, of multiple beams associated with the candidate cell that is indicated by the PDCCH order is used for the CBRA procedure, and the at least one transmission parameter comprises a transmission power level associated with the RACH procedure that is identified based at least in part on using, as a path loss reference signal, a reference signal associated with the beam selected for the CBRA procedure.

In a fourth aspect, alone or in combination with one or more of the first through third aspects, the at least one transmission parameter comprises a transmission power level associated with the RACH procedure that is identified based at least in part on using, as a path loss reference signal, a reference signal associated with a beam associated with the candidate cell that is indicated by the PDCCH order and, prior to the RACH procedure, the reference signal is measured or multiple measurements associated with the reference signal are filtered.

In a fifth aspect, alone or in combination with one or more of the first through fourth aspects, the reference signal is configured for at least one of: one of periodic or semi-persistent L1 measurement reporting, or one of periodic or semi-persistent layer 3 measurement reporting.

In a sixth aspect, alone or in combination with one or more of the first through fifth aspects, the reference signal is associated with a root quasi co-location source reference signal in an activated transmission configuration indicator state for the candidate cell that is indicated by the PDCCH order.

In a seventh aspect, alone or in combination with one or more of the first through sixth aspects, the configuration information indicates that the reference signal is at least one of associated with downlink timing, or dedicated to a path loss reference signal activation procedure.

In an eighth aspect, alone or in combination with one or more of the first through seventh aspects, a quantity of measurements associated with the reference signal are performed prior to the RACH procedure, and the quantity of measurements is one of indicated by the configuration information or based at least in part on a capability of the UE.

In a ninth aspect, alone or in combination with one or more of the first through eighth aspects, process 1000 includes transmitting, to the UE, a configuration of a power adjustment value associated with the RACH procedure, wherein a RACH communication is transmitted, based at least in part on a first transmit power, using a beam associated with the candidate cell that is indicated by the PDCCH order, wherein the RACH communication is retransmitted, based at least in part on a second transmit power, using the beam associated with the candidate cell that is indicated by the PDCCH order, and wherein the second transmit power is associated with the first transmit power adjusted according to the power adjustment value.

In a tenth aspect, alone or in combination with one or more of the first through ninth aspects, process 1000 includes transmitting, to the UE, another PDCCH order triggering another RACH procedure associated with another candidate cell, of the multiple candidate cells, that is indicated by the other PDCCH order, and receiving, from the UE and based at least in part on the first transmit power, another RACH communication using a beam associated with the other candidate cell that is indicated by the other PDCCH order.

In an eleventh aspect, alone or in combination with one or more of the first through tenth aspects, the RACH procedure is completed based at least in part on transmitting no additional PDCCH orders triggering a retransmission of a RACH communication associated with the RACH procedure within a threshold period of time from an initial transmission of the RACH communication.

In a twelfth aspect, alone or in combination with one or more of the first through eleventh aspects, the at least one transmission parameter comprises a power prioritization rule associated with transmitting a RACH communication associated with the RACH procedure that is applied based at least in part on the candidate cell that is indicated by the PDCCH order being a serving cell.

In a thirteenth aspect, alone or in combination with one or more of the first through twelfth aspects, the at least one transmission parameter comprises prioritization of transmission of a RACH communication associated with the RACH procedure over an uplink communication associated with a serving cell that overlaps, in a time domain, with the RACH communication based at least in part on the candidate cell that is indicated by the PDCCH order not being the serving cell.

In a fourteenth aspect, alone or in combination with one or more of the first through thirteenth aspects, process 1000 includes transmitting, to the UE, an indication of a time offset associated with the candidate cell that is indicated by the PDCCH order, wherein the time offset corresponds to a period of time between when a RACH communication associated with the RACH procedure is transmitted by the UE and a start of a time window when an RAR is to be received by the UE.

In a fifteenth aspect, alone or in combination with one or more of the first through fourteenth aspects, process 1000 includes transmitting, to the UE, an indication of multiple time offsets, wherein each time offset, of the multiple time offsets, is associated with a respective candidate cell, of the multiple candidate cells, wherein the at least one transmission parameter comprises selection of the time offset associated with the candidate cell that is indicated by the PDCCH order based at least in part on the PDCCH order.

In a sixteenth aspect, alone or in combination with one or more of the first through fifteenth aspects, process 1000 includes receiving, from the UE, a retransmission of the RACH communication based at least in part on not transmitting the RAR within the time window.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
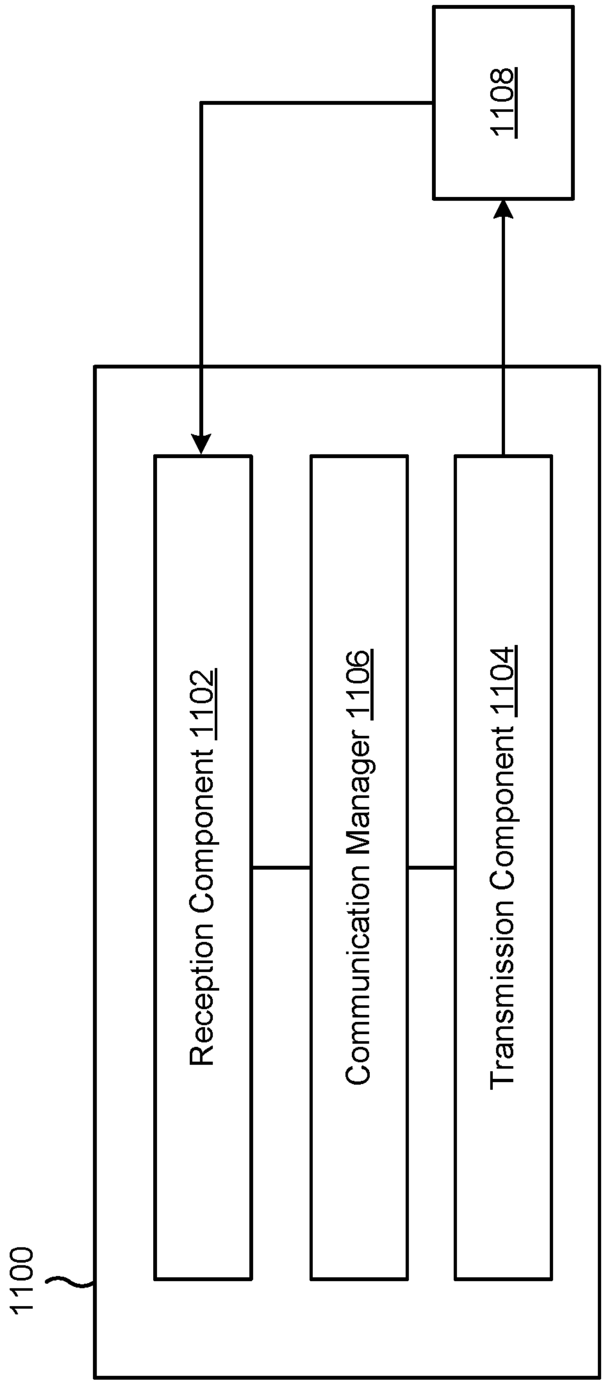
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIG. 6. Additionally, or alternatively, the apparatus 1100 may be configured to perform one or more processes described herein, such as process 700 of FIG. 7, process 800 of FIG. 8, or a combination thereof. In some aspects, the apparatus 1100 and/or one or more components shown in FIG. 11 may include one or more components of the UE 120 described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE 120 described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the UE 120 described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The reception component 1102 may receive configuration information that configures measurement of multiple candidate cells associated with an LTM procedure. The communication manager 1106 may perform measurements associated with the multiple candidate cells based at least in part on the configuration information. The transmission component 1104 may transmit an L1 measurement report that reports the measurements associated with the multiple candidate cells based at least in part on differential reporting.

The transmission component 1104 may transmit another L1 measurement report that reports measurements associated with multiple beams of a serving cell based at least in part on differential reporting.

The reception component 1102 may receive a PDCCH order triggering a RACH procedure associated with a candidate cell, of the multiple candidate cells, that is indicated by the PDCCH order.

The communication manager 1106 may perform the RACH procedure associated with the candidate cell that is indicated by the PDCCH order.

The communication manager 1106 may identify a transmission power level associated with the RACH procedure based at least in part on using, as a path loss reference signal, a reference signal associated with a beam that is indicated by the PDCCH order.

The communication manager 1106 may perform a quantity of measurements associated with the reference signal prior to performing the RACH procedure, wherein the quantity of measurements is one of indicated by the configuration information or based at least in part on a capability of the UE.

The reception component 1102 may receive a configuration of a power adjustment value associated with the RACH procedure.

The transmission component 1104 may transmit, using a first transmit power, a RACH communication using a beam associated with the candidate cell that is indicated by the PDCCH order.

The transmission component 1104 may retransmit, using a second transmit power, the RACH communication using the beam associated with the candidate cell that is indicated by the PDCCH order, wherein the second transmit power is associated with the first transmit power adjusted according to the power adjustment value.

The reception component 1102 may receive another PDCCH order triggering another RACH procedure associated with another candidate cell, of the multiple candidate cells, that is indicated by the other PDCCH order.

The transmission component 1104 may transmit, using the first transmit power, another RACH communication using a beam associated with the other candidate cell that is indicated by the other PDCCH order.

The communication manager 1106 may complete the RACH procedure based at least in part on receiving no additional PDCCH orders triggering a retransmission of a RACH communication associated with the RACH procedure within a threshold period of time from an initial transmission of the RACH communication.

The communication manager 1106 may apply a power prioritization rule associated with transmitting a RACH communication associated with the RACH procedure based at least in part on the candidate cell that is indicated by the PDCCH order being a serving cell.

The communication manager 1106 may prioritize transmission of a RACH communication associated with the RACH procedure over an uplink communication associated with a serving cell that overlaps, in a time domain, with the RACH communication based at least in part on the candidate cell that is indicated by the PDCCH order not being the serving cell.

The reception component 1102 may receive an indication of a time offset associated with the candidate cell that is indicated by the PDCCH order, wherein the time offset corresponds to a period of time between when a RACH communication associated with the RACH procedure is transmitted by the UE and a start of a time window when an RAR is to be received by the UE.

The reception component 1102 may receive an indication of multiple time offsets, wherein each time offset, of the multiple time offsets, is associated with a respective candidate cell, of the multiple candidate cells.

The communication manager 1106 may select the time offset associated with the candidate cell that is indicated by the PDCCH order based at least in part on receiving the PDCCH order.

The transmission component 1104 may retransmit the RACH communication based at least in part on not receiving the RAR within the time window.

The communication manager 1106 may perform the RACH procedure associated with the candidate cell that is indicated by the PDCCH order by identifying at least one transmission parameter associated with the RACH procedure based at least in part on the configuration information.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
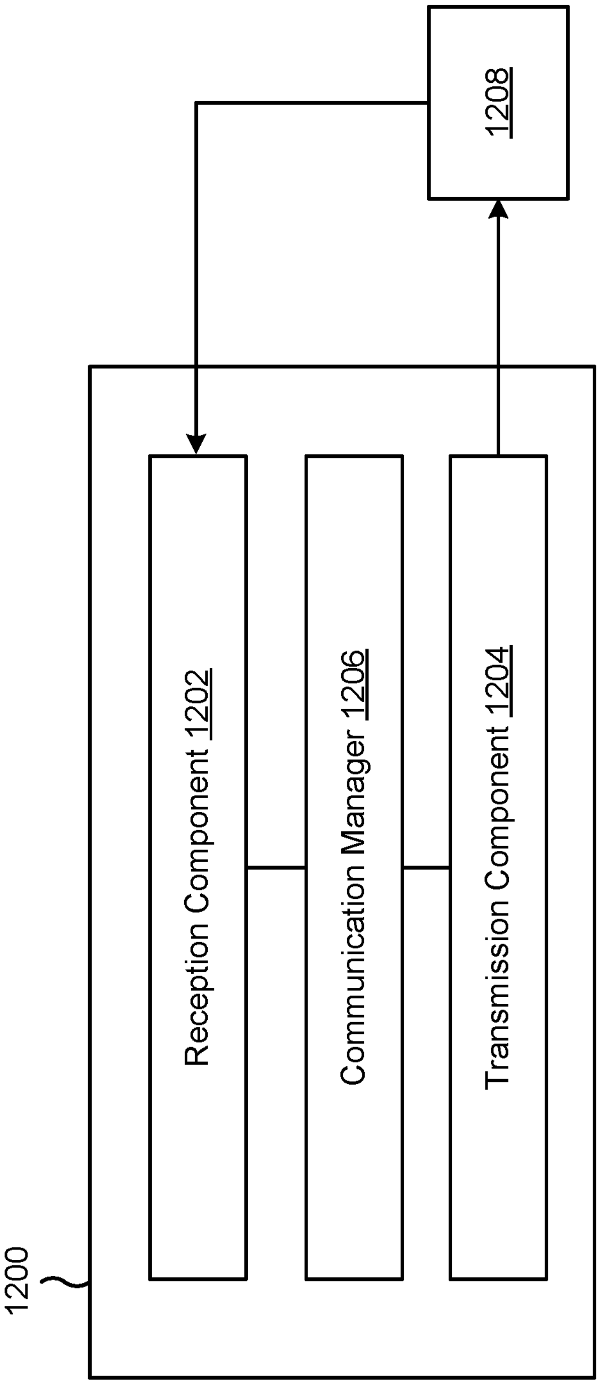
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a network node, or a network node may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 150 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIG. 6. Additionally, or alternatively, the apparatus 1200 may be configured to perform one or more processes described herein, such as process 900 of FIG. 9, process 1000 of FIG. 10, or a combination thereof. In some aspects, the apparatus 1200 and/or one or more components shown in FIG. 12 may include one or more components of the network node 110 described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node 110 described in connection with FIG. 2. In some aspects, the reception component 1202 and/or the transmission component 1204 may include or may be included in a network interface. The network interface may be configured to obtain and/or output signals for the apparatus 1200 via one or more communications links, such as a backhaul link, a midhaul link, and/or a fronthaul link.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the network node 110 described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The transmission component 1204 may transmit, to a UE, configuration information that configures measurement of multiple candidate cells associated with an LTM procedure. The reception component 1202 may receive, from the UE, an L1 measurement report that reports the measurements associated with the multiple candidate cells based at least in part on differential reporting.

The reception component 1202 may receive, from the UE, another L1 measurement report that reports measurements associated with multiple beams of a serving cell based at least in part on differential reporting.

The transmission component 1204 may transmit, to the UE, a PDCCH order triggering a RACH procedure associated with a candidate cell, of the multiple candidate cells, that is indicated by the PDCCH order.

The transmission component 1204 may transmit, to the UE, a configuration of a power adjustment value associated with the RACH procedure.

The transmission component 1204 may transmit, to the UE, another PDCCH order triggering another RACH procedure associated with another candidate cell, of the multiple candidate cells, that is indicated by the other PDCCH order.

The reception component 1202 may receive, from the UE and based at least in part on the first transmit power, another RACH communication using a beam associated with the other candidate cell that is indicated by the other PDCCH order.

The transmission component 1204 may transmit, to the UE, an indication of a time offset associated with the candidate cell that is indicated by the PDCCH order, wherein the time offset corresponds to a period of time between when a RACH communication associated with the RACH procedure is transmitted by the UE and a start of a time window when an RAR is to be received by the UE.

The transmission component 1204 may transmit, to the UE, an indication of multiple time offsets, wherein each time offset, of the multiple time offsets, is associated with a respective candidate cell, of the multiple candidate cells.

The reception component 1202 may receive, from the UE, a retransmission of the RACH communication based at least in part on not transmitting the RAR within the time window.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a UE, comprising: receiving configuration information that configures measurement of multiple candidate cells associated with an LTM procedure; performing measurements associated with the multiple candidate cells based at least in part on the configuration information; and transmitting an L1 measurement report that reports the measurements associated with the multiple candidate cells based at least in part on differential reporting.

Aspect 2: The method of Aspect 1, wherein the configuration information further configures measurement of multiple beams associated with the LTM procedure, and wherein each candidate cell, of the multiple candidate cells, is associated with a respective subset of beams, of the multiple beams.

Aspect 3: The method of Aspect 2, wherein the L1 measurement report indicates a reference value of a measurement associated with a strongest-measured beam, of the multiple beams, and wherein the L1 measurement report indicates differential values, with respect to the reference value, of measurements associated with each other beam, of the multiple beams, that is not the strongest-measured beam.

Aspect 4: The method of Aspect 3, wherein the L1 measurement report indicates the reference value first in a list of measurements, and wherein the L1 measurement report indicates the differential values second in the list of measurements by listing the differential values in descending order of size.

Aspect 5: The method of Aspect 4, wherein the L1 measurement report indicates, for each beam, of the multiple beams, a respective global resource indicator.

Aspect 6: The method of Aspect 4, wherein the L1 measurement report indicates, for each beam, of the multiple beams, a respective cell identifier and a respective local resource indicator.

Aspect 7: The method of Aspect 3, wherein the L1 measurement report indicates a list of multiple groups of beam measurements, wherein each group of beam measurements, of the multiple groups of beam measurements, is associated with a respective candidate cell, of the multiple candidate cells, and wherein, for each group of beam measurements, the L1 measurement report indicates a subset of the differential values, which are associated with the respective candidate cell, in descending order of size.

Aspect 8: The method of Aspect 7, wherein the L1 measurement report indicates a group of beam measurements that includes the reference value first in the list of multiple groups of beam measurements.

Aspect 9: The method of Aspect 7, wherein the L1 measurement report indicates, for each beam, of the multiple beams, a respective global resource indicator.

Aspect 10: The method of Aspect 7, wherein the L1 measurement report indicates, for each group of beam measurements, of the multiple groups of beam measurements, a respective cell identifier, and wherein the L1 measurement report indicates, for each beam, of the multiple beams, a respective local resource indicator.

Aspect 11: The method of Aspect 7, wherein the L1 measurement report indicates a beam measurement that is associated with the reference value.

Aspect 12: The method of Aspect 7, wherein the L1 measurement report indicates a group of beam measurements associated with a serving cell, and wherein the L1 measurement report indicates the group of beam measurements associated with the serving cell first in the list of multiple groups of beam measurements.

Aspect 13: The method of Aspect 12, wherein the L1 measurement report omits a cell identifier associated with the group of beam measurements associated with the serving cell.

Aspect 14: The method of Aspect 12, wherein the L1 measurement report indicates another reference value of a measurement associated with a strongest-measured beam of the serving cell, and wherein the L1 measurement report indicates other differential values, with respect to the other reference value, of measurements associated with each other beam, of beams associated with the serving cell, that is not the strongest-measured beam of the serving cell.

Aspect 15: The method of Aspect 2, further comprising transmitting another L1 measurement report that reports measurements associated with multiple beams of a serving cell based at least in part on differential reporting.

Aspect 16: The method of Aspect 2, wherein the L1 measurement report indicates measurements associated with multiple beams of a serving cell based at least in part on differential reporting.

Aspect 17: The method of Aspect 2, wherein the L1 measurement report indicates, for each candidate cell: a reference value of a measurement associated with a strongest-measured beam, of the respective subset of beams, and differential values, with respect to the reference value, of measurements associated with each other beam, of the respective subset of beams, that is not the strongest-measured beam.

Aspect 18: The method of Aspect 2, wherein the L1 measurement report indicates: a reference value of a measurement associated with a strongest-measured beam, of the multiple beams, for each candidate cell, of the multiple candidate cells, that does not include the strongest-measured beam, a differential value, with respect to the reference value, of a measurement associated with a strongest-measured beam, of the respective subset of beams, and for each candidate cell, of the multiple candidate cells, differential values, with respect to a value of the measurement associated with the strongest-measured beam of the respective candidate cell, of measurements associated with each other beam, of the respective subset of beams, that is not the strongest-measured beam.

Aspect 19: The method of Aspect 2, wherein the L1 measurement report indicates that a measurement is associated with a strongest-measured beam, of the multiple beams, based at least in part on including the measurement associated with the strongest-measured beam at a specific location within the L1 measurement report.

Aspect 20: The method of Aspect 19, wherein the specific location is associated with a first-listed measurement in the L1 measurement report.

Aspect 21: The method of Aspect 2, wherein the L1 measurement report indicates measurements associated with the multiple beams in a specific order based at least in part on respective beam identifiers associated with the multiple beams.

Aspect 22: The method of Aspect 21, wherein the L1 measurement report indicates a location of a measurement associated with a strongest-measured beam, of the multiple beams.

Aspect 23: The method of Aspect 2, wherein each beam, of the multiple beams, is associated with a local resource indicator, and wherein a length of a local resource indicator associated with each beam, of a first subset of beams associated with a first candidate cell, is different than a length of a local resource indicator associated with each beam of a second subset of beams associated with a second candidate cell.

Aspect 24: The method of Aspect 2, wherein each beam, of the multiple beams, is associated with a local resource indicator, and wherein a length of each local resource indicator is based at least in part on a quantity of beams associated with a candidate cell, of the multiple candidate cells, that includes a highest quantity of beams.

Aspect 25: The method of any of Aspects 1-24, further comprising: receiving a PDCCH order triggering a RACH procedure associated with a candidate cell, of the multiple candidate cells, that is indicated by the PDCCH order; and performing the RACH procedure associated with the candidate cell that is indicated by the PDCCH order.

Aspect 26: The method of Aspect 25, further comprising identifying a transmission power level associated with the RACH procedure based at least in part on using, as a path loss reference signal, a reference signal associated with a beam that is indicated by the PDCCH order.

Aspect 27: The method of Aspect 26, wherein the beam that is indicated by the PDCCH order is configured for one of periodic or semi-persistent L1 measurement reporting.

Aspect 28: The method of Aspect 25, wherein the RACH procedure is associated with a CBRA procedure, and wherein the method further comprises: selecting, for the CBRA procedure, a beam, of multiple beams associated with the candidate cell that is indicated by the PDCCH order; and identifying a transmission power level associated with the RACH procedure based at least in part on using, as a path loss reference signal, a reference signal associated with the beam selected for the CBRA procedure.

Aspect 29: The method of Aspect 25, further comprising: identifying a transmission power level associated with the RACH procedure based at least in part on using, as a path loss reference signal, a reference signal associated with a beam associated with the candidate cell that is indicated by the PDCCH order; and prior to performing the RACH procedure, at least one of: measuring the reference signal, or filtering multiple measurements associated with the reference signal.

Aspect 30: The method of Aspect 29, wherein the reference signal is configured for at least one of: one of periodic or semi-persistent L1 measurement reporting; or one of periodic or semi-persistent layer 3 measurement reporting.

Aspect 31: The method of Aspect 29, wherein the reference signal is associated with a root quasi co-location source reference signal in an activated transmission configuration indicator state for the candidate cell that is indicated by the PDCCH order.

Aspect 32: The method of Aspect 29, wherein the configuration information indicates that the reference signal is at least one of associated with downlink timing, or dedicated to a path loss reference signal activation procedure.

Aspect 33: The method of Aspect 29, further comprising performing a quantity of measurements associated with the reference signal prior to performing the RACH procedure, wherein the quantity of measurements is one of indicated by the configuration information or based at least in part on a capability of the UE.

Aspect 34: The method of Aspect 25, further comprising: receiving a configuration of a power adjustment value associated with the RACH procedure; transmitting, using a first transmit power, a RACH communication using a beam associated with the candidate cell that is indicated by the PDCCH order; and retransmitting, using a second transmit power, the RACH communication using the beam associated with the candidate cell that is indicated by the PDCCH order, wherein the second transmit power is associated with the first transmit power adjusted according to the power adjustment value.

Aspect 35: The method of Aspect 34, further comprising: receiving another PDCCH order triggering another RACH procedure associated with another candidate cell, of the multiple candidate cells, that is indicated by the other PDCCH order; and transmitting, using the first transmit power, another RACH communication using a beam associated with the other candidate cell that is indicated by the other PDCCH order.

Aspect 36: The method of Aspect 25, further comprising completing the RACH procedure based at least in part on receiving no additional PDCCH orders triggering a retransmission of a RACH communication associated with the RACH procedure within a threshold period of time from an initial transmission of the RACH communication.

Aspect 37: The method of Aspect 25, further comprising applying a power prioritization rule associated with transmitting a RACH communication associated with the RACH procedure based at least in part on the candidate cell that is indicated by the PDCCH order being a serving cell.

Aspect 38: The method of Aspect 25, further comprising prioritizing transmission of a RACH communication associated with the RACH procedure over an uplink communication associated with a serving cell that overlaps, in a time domain, with the RACH communication based at least in part on the candidate cell that is indicated by the PDCCH order not being the serving cell.

Aspect 39: The method of Aspect 25, further comprising receiving an indication of a time offset associated with the candidate cell that is indicated by the PDCCH order, wherein the time offset corresponds to a period of time between when a RACH communication associated with the RACH procedure is transmitted by the UE and a start of a time window when an RAR is to be received by the UE.

Aspect 40: The method of Aspect 39, further comprising: receiving an indication of multiple time offsets, wherein each time offset, of the multiple time offsets, is associated with a respective candidate cell, of the multiple candidate cells; and selecting the time offset associated with the candidate cell that is indicated by the PDCCH order based at least in part on receiving the PDCCH order.

Aspect 41: The method of Aspect 39, further comprising retransmitting the RACH communication based at least in part on not receiving the RAR within the time window.

Aspect 42: A method of wireless communication performed by a UE, comprising: receiving configuration information that configures measurement of multiple candidate cells associated with an LTM procedure; receiving PDCCH order triggering a RACH procedure associated with a candidate cell, of the multiple candidate cells, that is indicated by the PDCCH order; and performing the RACH procedure associated with the candidate cell that is indicated by the PDCCH order by identifying at least one transmission parameter associated with the RACH procedure based at least in part on the configuration information.

Aspect 43: The method of Aspect 42, wherein identifying the at least one transmission parameter associated with the RACH procedure comprises identifying a transmission power level associated with the RACH procedure based at least in part on using, as a path loss reference signal, a reference signal associated with a beam that is indicated by the PDCCH order.

Aspect 44: The method of Aspect 43, wherein the beam that is indicated by the PDCCH order is configured for one of periodic or semi-persistent L1 measurement reporting.

Aspect 45: The method of any of Aspects 42-44, wherein the RACH procedure is associated with a CBRA procedure, and wherein the method further comprises selecting, for the CBRA procedure, a beam, of multiple beams associated with the candidate cell that is indicated by the PDCCH order, and wherein identifying the at least one transmission parameter associated with the RACH procedure comprises identifying a transmission power level associated with the RACH procedure based at least in part on using, as a path loss reference signal, a reference signal associated with the beam selected for the CBRA procedure.

Aspect 46: The method of any of Aspects 42-45, wherein identifying the at least one transmission parameter associated with the RACH procedure comprises identifying a transmission power level associated with the RACH procedure based at least in part on using, as a path loss reference signal, a reference signal associated with a beam associated with the candidate cell that is indicated by the PDCCH order, and wherein the method further comprises, prior to performing the RACH procedure, at least one of: measuring the reference signal, or filtering multiple measurements associated with the reference signal.

Aspect 47: The method of Aspect 46, wherein the reference signal is configured for at least one of: one of periodic or semi-persistent L1 measurement reporting; or one of periodic or semi-persistent layer 3 measurement reporting.

Aspect 48: The method of Aspect 46, wherein the reference signal is associated with a root quasi co-location source reference signal in an activated transmission configuration indicator state for the candidate cell that is indicated by the PDCCH order.

Aspect 49: The method of Aspect 46, wherein the configuration information indicates that the reference signal is at least one of associated with downlink timing, or dedicated to a path loss reference signal activation procedure.

Aspect 50: The method of Aspect 46, further comprising performing a quantity of measurements associated with the reference signal prior to performing the RACH procedure, wherein the quantity of measurements is one of indicated by the configuration information or based at least in part on a capability of the UE.

Aspect 51: The method of any of Aspects 42-50, further comprising receiving a configuration of a power adjustment value associated with the RACH procedure, wherein identifying the at least one transmission parameter associated with the RACH procedure comprises: transmitting, using a first transmit power, a RACH communication using a beam associated with the candidate cell that is indicated by the PDCCH order; and retransmitting, using a second transmit power, the RACH communication using the beam associated with the candidate cell that is indicated by the PDCCH order, wherein the second transmit power is associated with the first transmit power adjusted according to the power adjustment value.

Aspect 52: The method of Aspect 51, further comprising: receiving another PDCCH order triggering another RACH procedure associated with another candidate cell, of the multiple candidate cells, that is indicated by the other PDCCH order; and transmitting, using the first transmit power, another RACH communication using a beam associated with the other candidate cell that is indicated by the other PDCCH order.

Aspect 53: The method of any of Aspects 42-52, further comprising completing the RACH procedure based at least in part on receiving no additional PDCCH orders triggering a retransmission of a RACH communication associated with the RACH procedure within a threshold period of time from an initial transmission of the RACH communication.

Aspect 54: The method of any of Aspects 42-53, wherein identifying the at least one transmission parameter associated with the RACH procedure comprises applying a power prioritization rule associated with transmitting a RACH communication associated with the RACH procedure based at least in part on the candidate cell that is indicated by the PDCCH order being a serving cell.

Aspect 55: The method of any of Aspects 42-54, wherein identifying the at least one transmission parameter associated with the RACH procedure comprises prioritizing transmission of a RACH communication associated with the RACH procedure over an uplink communication associated with a serving cell that overlaps, in a time domain, with the RACH communication based at least in part on the candidate cell that is indicated by the PDCCH order not being the serving cell.

Aspect 56: The method of any of Aspects 42-55, further comprising receiving an indication of a time offset associated with the candidate cell that is indicated by the PDCCH order, wherein the time offset corresponds to a period of time between when a RACH communication associated with the RACH procedure is transmitted by the UE and a start of a time window when an RAR is to be received by the UE.

Aspect 57: The method of Aspect 56, further comprising: receiving an indication of multiple time offsets, wherein each time offset, of the multiple time offsets, is associated with a respective candidate cell, of the multiple candidate cells, wherein identifying the at least one transmission parameter associated with the RACH procedure comprises selecting the time offset associated with the candidate cell that is indicated by the PDCCH order based at least in part on receiving the PDCCH order.

Aspect 58: The method of Aspect 56, further comprising retransmitting the RACH communication based at least in part on not receiving the RAR within the time window.

Aspect 59: A method of wireless communication performed by a network node, comprising: transmitting, to a UE, configuration information that configures measurement of multiple candidate cells associated with an LTM procedure; and receiving, from the UE, an L1 measurement report that reports the measurements associated with the multiple candidate cells based at least in part on differential reporting.

Aspect 60: The method of Aspect 59, wherein the configuration information further configures measurement of multiple beams associated with the LTM procedure, and wherein each candidate cell, of the multiple candidate cells, is associated with a respective subset of beams, of the multiple beams.

Aspect 61: The method of Aspect 60, wherein the L1 measurement report indicates a reference value of a measurement associated with a strongest-measured beam, of the multiple beams, and wherein the L1 measurement report indicates differential values, with respect to the reference value, of measurements associated with each other beam, of the multiple beams, that is not the strongest-measured beam.

Aspect 62: The method of Aspect 61, wherein the L1 measurement report indicates the reference value first in a list of measurements, and wherein the L1 measurement report indicates the differential values second in the list of measurements by listing the differential values in descending order of size.

Aspect 63: The method of Aspect 62, wherein the L1 measurement report indicates, for each beam, of the multiple beams, a respective global resource indicator.

Aspect 64: The method of Aspect 62, wherein the L1 measurement report indicates, for each beam, of the multiple beams, a respective cell identifier and a respective local resource indicator.

Aspect 65: The method of Aspect 61, wherein the L1 measurement report indicates a list of multiple groups of beam measurements, wherein each group of beam measurements, of the multiple groups of beam measurements, is associated with a respective candidate cell, of the multiple candidate cells, and wherein, for each group of beam measurements, the L1 measurement report indicates a subset of the differential values, which are associated with the respective candidate cell, in descending order of size.

Aspect 66: The method of Aspect 65, wherein the L1 measurement report indicates a group of beam measurements that includes the reference value first in the list of multiple groups of beam measurements.

Aspect 67: The method of Aspect 65, wherein the L1 measurement report indicates, for each beam, of the multiple beams, a respective global resource indicator.

Aspect 68: The method of Aspect 65, wherein the L1 measurement report indicates, for each group of beam measurements, of the multiple groups of beam measurements, a respective cell identifier, and wherein the L1 measurement report indicates, for each beam, of the multiple beams, a respective local resource indicator.

Aspect 69: The method of Aspect 65, wherein the L1 measurement report indicates a beam measurement that is associated with the reference value.

Aspect 70: The method of Aspect 65, wherein the L1 measurement report indicates a group of beam measurements associated with a serving cell, and wherein the L1 measurement report indicates the group of beam measurements associated with the serving cell first in the list of multiple groups of beam measurements.

Aspect 71: The method of Aspect 70, wherein the L1 measurement report omits a cell identifier associated with the group of beam measurements associated with the serving cell.

Aspect 72: The method of Aspect 70, wherein the L1 measurement report indicates another reference value of a measurement associated with a strongest-measured beam of the serving cell, and wherein the L1 measurement report indicates other differential values, with respect to the other reference value, of measurements associated with each other beam, of beams associated with the serving cell, that is not the strongest-measured beam of the serving cell.

Aspect 73: The method of Aspect 60, further comprising receiving, from the UE, another L1 measurement report that reports measurements associated with multiple beams of a serving cell based at least in part on differential reporting.

Aspect 74: The method of Aspect 60, wherein the L1 measurement report indicates measurements associated with multiple beams of a serving cell based at least in part on differential reporting.

Aspect 75: The method of Aspect 60, wherein the L1 measurement report indicates, for each candidate cell: a reference value of a measurement associated with a strongest-measured beam, of the respective subset of beams, and differential values, with respect to the reference value, of measurements associated with each other beam, of the respective subset of beams, that is not the strongest-measured beam.

Aspect 76: The method of Aspect 60, wherein the L1 measurement report indicates: a reference value of a measurement associated with a strongest-measured beam, of the multiple beams, for each candidate cell, of the multiple candidate cells, that does not include the strongest-measured beam, a differential value, with respect to the reference value, of a measurement associated with a strongest-measured beam, of the respective subset of beams, and for each candidate cell, of the multiple candidate cells, differential values, with respect to a value of the measurement associated with the strongest-measured beam of the respective candidate cell, of measurements associated with each other beam, of the respective subset of beams, that is not the strongest-measured beam.

Aspect 77: The method of Aspect 60, wherein the L1 measurement report indicates that a measurement is associated with a strongest-measured beam, of the multiple beams, based at least in part on including the measurement associated with the strongest-measured beam at a specific location within the L1 measurement report.

Aspect 78: The method of Aspect 77, wherein the specific location is associated with a first-listed measurement in the L1 measurement report.

Aspect 79: The method of Aspect 60, wherein the L1 measurement report indicates measurements associated with the multiple beams in a specific order based at least in part on respective beam identifiers associated with the multiple beams.

Aspect 80: The method of Aspect 79, wherein the L1 measurement report indicates a location of a measurement associated with a strongest-measured beam, of the multiple beams.

Aspect 81: The method of Aspect 60, wherein each beam, of the multiple beams, is associated with a local resource indicator, and wherein a length of a local resource indicator associated with each beam, of a first subset of beams associated with a first candidate cell, is different than a length of a local resource indicator associated with each beam of a second subset of beams associated with a second candidate cell.

Aspect 82: The method of Aspect 60, wherein each beam, of the multiple beams, is associated with a local resource indicator, and wherein a length of each local resource indicator is based at least in part on a quantity of beams associated with a candidate cell, of the multiple candidate cells, that includes a highest quantity of beams.

Aspect 83: The method of any of Aspects 59-82, further comprising: transmitting, to the UE, a PDCCH order triggering a RACH procedure associated with a candidate cell, of the multiple candidate cells, that is indicated by the PDCCH order.

Aspect 84: The method of Aspect 83, wherein a transmission power level associated with the RACH procedure is based at least in part on using, as a path loss reference signal, a reference signal associated with a beam that is indicated by the PDCCH order.

Aspect 85: The method of Aspect 84, wherein the beam that is indicated by the PDCCH order is configured for one of periodic or semi-persistent L1 measurement reporting.

Aspect 86: The method of Aspect 83, wherein the RACH procedure is associated with a CBRA procedure, wherein a beam, of multiple beams associated with the candidate cell that is indicated by the PDCCH order is used for the CBRA procedure, and wherein a transmission power level associated with the RACH procedure is based at least in part on using, as a path loss reference signal, a reference signal associated with the beam selected for the CBRA procedure.

Aspect 87: The method of Aspect 83, wherein a transmission power level associated with the RACH procedure is based at least in part on using, as a path loss reference signal, a reference signal associated with a beam associated with the candidate cell that is indicated by the PDCCH order, and wherein, prior to the RACH procedure, the reference signal is measured or multiple measurements associated with the reference signal are filtered.

Aspect 88: The method of Aspect 87, wherein the reference signal is configured for at least one of: one of periodic or semi-persistent L1 measurement reporting; or one of periodic or semi-persistent layer 3 measurement reporting.

Aspect 89: The method of Aspect 87, wherein the reference signal is associated with a root quasi co-location source reference signal in an activated transmission configuration indicator state for the candidate cell that is indicated by the PDCCH order.

Aspect 90: The method of Aspect 87, wherein the configuration information indicates that the reference signal is at least one of associated with downlink timing, or dedicated to a path loss reference signal activation procedure.

Aspect 91: The method of Aspect 87, wherein a quantity of measurements associated with the reference signal are performed prior to performing the RACH procedure, and wherein the quantity of measurements is one of indicated by the configuration information or based at least in part on a capability of the UE.

Aspect 92: The method of Aspect 83, further comprising transmitting, to the UE, a configuration of a power adjustment value associated with the RACH procedure, wherein a RACH communication is transmitted, based at least in part on a first transmit power, using a beam associated with the candidate cell that is indicated by the PDCCH order, wherein the RACH communication is retransmitted, based at least in part on a second transmit power, using the beam associated with the candidate cell that is indicated by the PDCCH order, and wherein the second transmit power is associated with the first transmit power adjusted according to the power adjustment value.

Aspect 93: The method of Aspect 92, further comprising: transmitting, to the UE, another PDCCH order triggering another RACH procedure associated with another candidate cell, of the multiple candidate cells, that is indicated by the other PDCCH order; and receiving, from the UE and based at least in part on the first transmit power, another RACH communication using a beam associated with the other candidate cell that is indicated by the other PDCCH order.

Aspect 94: The method of Aspect 83, wherein the RACH procedure is completed based at least in part on transmitting no additional PDCCH orders triggering a retransmission of a RACH communication associated with the RACH procedure within a threshold period of time from an initial transmission of the RACH communication.

Aspect 95: The method of Aspect 83, wherein a power prioritization rule associated with transmitting a RACH communication associated with the RACH procedure is applied based at least in part on the candidate cell that is indicated by the PDCCH order being a serving cell.

Aspect 96: The method of Aspect 83, wherein a transmission of a RACH communication associated with the RACH procedure is prioritized over an uplink communication associated with a serving cell that overlaps, in a time domain, with the RACH communication based at least in part on the candidate cell that is indicated by the PDCCH order not being the serving cell.

Aspect 97: The method of Aspect 83, further comprising transmitting, to the UE, an indication of a time offset associated with the candidate cell that is indicated by the PDCCH order, wherein the time offset corresponds to a period of time between when a RACH communication associated with the RACH procedure is transmitted by the UE and a start of a time window when an RAR is to be received by the UE.

Aspect 98: The method of Aspect 97, further comprising transmitting, to the UE, an indication of multiple time offsets, wherein each time offset, of the multiple time offsets, is associated with a respective candidate cell, of the multiple candidate cells.

Aspect 99: The method of Aspect 97, further comprising receiving, from the UE, a retransmission of the RACH communication based at least in part on not transmitting the RAR within the time window.

Aspect 100: A method of wireless communication performed by a network node, comprising: transmitting, to a UE, configuration information that configures measurement of multiple candidate cells associated with an LTM procedure; and transmitting, to the UE, a PDCCH order triggering a RACH procedure associated with a candidate cell, of the multiple candidate cells, that is indicated by the PDCCH order, wherein a RACH procedure associated with the candidate cell that is indicated by the PDCCH order is based at least in part on at least one transmission parameter that is identified based at least in part on the configuration information.

Aspect 101: The method of Aspect 100, wherein the at least one transmission parameter comprises a transmission power level associated with the RACH procedure that is identified based at least in part on using, as a path loss reference signal, a reference signal associated with a beam that is indicated by the PDCCH order.

Aspect 102: The method of Aspect 101, wherein the beam that is indicated by the PDCCH order is configured for one of periodic or semi-persistent L1 measurement reporting.

Aspect 103: The method of any of Aspects 100-102, wherein the RACH procedure is associated with a CBRA procedure, and wherein a beam, of multiple beams associated with the candidate cell that is indicated by the PDCCH order is used for the CBRA procedure, and wherein the at least one transmission parameter comprises a transmission power level associated with the RACH procedure that is identified based at least in part on using, as a path loss reference signal, a reference signal associated with the beam selected for the CBRA procedure.

Aspect 104: The method of any of Aspects 100-103, wherein the at least one transmission parameter comprises a transmission power level associated with the RACH procedure that is identified based at least in part on using, as a path loss reference signal, a reference signal associated with a beam associated with the candidate cell that is indicated by the PDCCH order, and wherein, prior to the RACH procedure, the reference signal is measured or multiple measurements associated with the reference signal are filtered.

Aspect 105: The method of Aspect 104, wherein the reference signal is configured for at least one of: one of periodic or semi-persistent L1 measurement reporting; or one of periodic or semi-persistent layer 3 measurement reporting.

Aspect 106: The method of Aspect 104, wherein the reference signal is associated with a root quasi co-location source reference signal in an activated transmission configuration indicator state for the candidate cell that is indicated by the PDCCH order.

Aspect 107: The method of Aspect 104, wherein the configuration information indicates that the reference signal is at least one of associated with downlink timing, or dedicated to a path loss reference signal activation procedure.

Aspect 108: The method of Aspect 104, wherein a quantity of measurements associated with the reference signal are performed prior to the RACH procedure, and wherein the quantity of measurements is one of indicated by the configuration information or based at least in part on a capability of the UE.

Aspect 109: The method of any of Aspects 100-108, further comprising transmitting, to the UE, a configuration of a power adjustment value associated with the RACH procedure, wherein a RACH communication is transmitted, based at least in part on a first transmit power, using a beam associated with the candidate cell that is indicated by the PDCCH order, wherein the RACH communication is retransmitted, based at least in part on a second transmit power, using the beam associated with the candidate cell that is indicated by the PDCCH order, and wherein the second transmit power is associated with the first transmit power adjusted according to the power adjustment value.

Aspect 110: The method of Aspect 109, further comprising: transmitting, to the UE, another PDCCH order triggering another RACH procedure associated with another candidate cell, of the multiple candidate cells, that is indicated by the other PDCCH order; and receiving, from the UE and based at least in part on the first transmit power, another RACH communication using a beam associated with the other candidate cell that is indicated by the other PDCCH order.

Aspect 111: The method of any of Aspects 100-110, wherein the RACH procedure is completed based at least in part on transmitting no additional PDCCH orders triggering a retransmission of a RACH communication associated with the RACH procedure within a threshold period of time from an initial transmission of the RACH communication.

Aspect 112: The method of any of Aspects 100-111, wherein the at least one transmission parameter comprises a power prioritization rule associated with transmitting a RACH communication associated with the RACH procedure that is applied based at least in part on the candidate cell that is indicated by the PDCCH order being a serving cell.

Aspect 113: The method of any of Aspects 100-112, wherein the at least one transmission parameter comprises prioritization of transmission of a RACH communication associated with the RACH procedure over an uplink communication associated with a serving cell that overlaps, in a time domain, with the RACH communication based at least in part on the candidate cell that is indicated by the PDCCH order not being the serving cell.

Aspect 114: The method of any of Aspects 100-113, further comprising transmitting, to the UE, an indication of a time offset associated with the candidate cell that is indicated by the PDCCH order, wherein the time offset corresponds to a period of time between when a RACH communication associated with the RACH procedure is transmitted by the UE and a start of a time window when an RAR is to be received by the UE.

Aspect 115: The method of Aspect 114, further comprising: transmitting, to the UE, an indication of multiple time offsets, wherein each time offset, of the multiple time offsets, is associated with a respective candidate cell, of the multiple candidate cells, wherein the at least one transmission parameter comprises selection of the time offset associated with the candidate cell that is indicated by the PDCCH order based at least in part on the PDCCH order.

Aspect 116: The method of Aspect 114, further comprising receiving, from the UE, a retransmission of the RACH communication based at least in part on not transmitting the RAR within the time window.

Aspect 117: An apparatus for wireless communication at a device, comprising a processor; memory coupled with the processor; and instructions stored in the memory and executable by the processor to cause the apparatus to perform the method of one or more of Aspects 1-116.

Aspect 118: A device for wireless communication, comprising a memory and one or more processors coupled to the memory, the one or more processors configured to perform the method of one or more of Aspects 1-116.

Aspect 119: An apparatus for wireless communication, comprising at least one means for performing the method of one or more of Aspects 1-116.

Aspect 120: A non-transitory computer-readable medium storing code for wireless communication, the code comprising instructions executable by a processor to perform the method of one or more of Aspects 1-116.

Aspect 121: A non-transitory computer-readable medium storing a set of instructions for wireless communication, the set of instructions comprising one or more instructions that, when executed by one or more processors of a device, cause the device to perform the method of one or more of Aspects 1-116.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A user equipment (UE) for wireless communication, comprising:

one or more memories; and one or more processors coupled to the one or more memories, the one or more processors individually or collectively configured to:

receive configuration information that configures measurement of multiple candidate cells associated with a layer 1/layer 2 triggered mobility (LTM) procedure;

perform measurements associated with the multiple candidate cells based at least in part on the configuration information;

transmit a layer 1 (L1) measurement report that reports the measurements associated with the multiple candidate cells based at least in part on differential reporting;

receive a physical downlink control channel (PDCCH) order triggering a random access channel (RACH) procedure associated with a candidate cell, of the multiple candidate cells, that is indicated by the PDCCH order;

perform the RACH procedure associated with the candidate cell that is indicated by the PDCCH order; and prioritize transmission of a RACH communication associated with the RACH procedure over an uplink communication associated with a serving cell that overlaps, in a time domain, with the RACH communication based at least in part on the candidate cell that is indicated by the PDCCH order not being the serving cell.

2. The UE of claim 1, wherein the configuration information further configures measurement of multiple beams associated with the LTM procedure, and wherein each candidate cell, of the multiple candidate cells, is associated with a respective subset of beams, of the multiple beams.

3. The UE of claim 2, wherein the L1 measurement report indicates a reference value of a measurement associated with a strongest-measured beam, of the multiple beams, and wherein the L1 measurement report indicates differential values, with respect to the reference value, of measurements associated with each other beam, of the multiple beams, that is not the strongest-measured beam.

4. The UE of claim 3, wherein the L1 measurement report indicates the reference value first in a list of measurements, and wherein the L1 measurement report indicates the differential values second in the list of measurements by listing the differential values in descending order of size.

5. The UE of claim 4, wherein the L1 measurement report indicates, for each beam, of the multiple beams, a respective global resource indicator.

6. A user equipment (UE) for wireless communication, comprising:

one or more memories; and one or more processors coupled to the one or more memories, the one or more processors individually or collectively configured to:

receive configuration information that configures measurement of multiple candidate cells associated with a layer 1/layer 2 triggered mobility (LTM) procedure;

perform measurements associated with the multiple candidate cells based at least in part on the configuration information;

transmit a layer 1 (L1) measurement report that reports the measurements associated with the multiple candidate cells based at least in part on differential reporting;

receive a physical downlink control channel (PDCCH) order triggering a random access channel (RACH) procedure associated with a candidate cell, of the multiple candidate cells, that is indicated by the PDCCH order;

perform the RACH procedure associated with the candidate cell that is indicated by the PDCCH order;

receive a configuration of a power adjustment value associated with the RACH procedure;

transmit, using a first transmit power, a RACH communication using a beam associated with the candidate cell that is indicated by the PDCCH order;

retransmit, using a second transmit power, the RACH communication using the beam associated with the candidate cell that is indicated by the PDCCH order, wherein the second transmit power is associated with the first transmit power adjusted according to the power adjustment value;

receive another PDCCH order triggering another RACH procedure associated with another candidate cell, of the multiple candidate cells, that is indicated by the other PDCCH order; and transmit, using the first transmit power, another RACH communication using a beam associated with the other candidate cell that is indicated by the other PDCCH order.

7. A user equipment (UE) for wireless communication, comprising:

one or more memories; and one or more processors coupled to the one or more memories, the one or more processors individually or collectively configured to:

receive configuration information that configures measurement of multiple candidate cells associated with a layer 1/layer 2 triggered mobility (LTM) procedure;

perform measurements associated with the multiple candidate cells based at least in part on the configuration information;

transmit a layer 1 (L1) measurement report that reports the measurements associated with the multiple candidate cells based at least in part on differential reporting;

receive a physical downlink control channel (PDCCH) order triggering a random access channel (RACH) procedure associated with a candidate cell, of the multiple candidate cells, that is indicated by the PDCCH order;

perform the RACH procedure associated with the candidate cell that is indicated by the PDCCH order; and apply a power prioritization rule associated with transmitting a RACH communication associated with the RACH procedure based at least in part on the candidate cell that is indicated by the PDCCH order being a serving cell.

8. The UE of claim 6, wherein the configuration information further configures measurement of multiple beams associated with the LTM procedure, and wherein each candidate cell, of the multiple candidate cells, is associated with a respective subset of beams, of the multiple beams.

9. The UE of claim 8, wherein the L1 measurement report indicates a reference value of a measurement associated with a strongest-measured beam, of the multiple beams, and wherein the L1 measurement report indicates differential values, with respect to the reference value, of measurements associated with each other beam, of the multiple beams, that is not the strongest-measured beam.

10. The UE of claim 9, wherein the L1 measurement report indicates the reference value first in a list of measurements, and wherein the L1 measurement report indicates the differential values second in the list of measurements by listing the differential values in descending order of size.

11. The UE of claim 10, wherein the L1 measurement report indicates, for each beam, of the multiple beams, a respective global resource indicator.

12. The UE of claim 6, wherein the configuration information further configures measurement of multiple beams associated with the LTM procedure, and wherein the L1 measurement report indicates differential values, with respect to a reference value, of measurements associated with each other beam, of multiple beams.

13. The UE of claim 6, wherein the L1 measurement report indicates differential values in a list of measurements by listing the differential values in descending order of size.

14. The UE of claim 7, wherein the configuration information further configures measurement of multiple beams associated with the LTM procedure, and wherein each candidate cell, of the multiple candidate cells, is associated with a respective subset of beams, of the multiple beams.

15. The UE of claim 14, wherein the L1 measurement report indicates a reference value of a measurement associated with a strongest-measured beam, of the multiple beams, and wherein the L1 measurement report indicates differential values, with respect to the reference value, of measurements associated with each other beam, of the multiple beams, that is not the strongest-measured beam.

16. The UE of claim 15, wherein the L1 measurement report indicates the reference value first in a list of measurements, and wherein the L1 measurement report indicates the differential values second in the list of measurements by listing the differential values in descending order of size.

17. The UE of claim 16, wherein the L1 measurement report indicates, for each beam, of the multiple beams, a respective global resource indicator.

18. The UE of claim 7, wherein the configuration information further configures measurement of multiple beams associated with the LTM procedure, and wherein the L1 measurement report indicates differential values, with respect to a reference value, of measurements associated with each other beam, of the multiple beams.

19. The UE of claim 7, wherein the L1 measurement report indicates differential values in a list of measurements by listing the differential values in descending order of size.

20. The UE of claim 1, wherein the configuration information further configures measurement of multiple beams associated with the LTM procedure, and wherein the L1 measurement report indicates differential values, with respect to a reference value, of measurements associated with each other beam, of the multiple beams.

* * * * *